United States Patent [19]

Sakata et al.

[11] Patent Number: 5,083,653

[45] Date of Patent: Jan. 28, 1992

[54] CONTROL APPARATUS FOR PASSENGER CONVEYER

[75] Inventors: Kazuhiro Sakata; Hisao Chiba, both of Katsuta, Japan

[73] Assignee: Hitachi, Ltd., Tokyo, Japan

[21] Appl. No.: 552,512

[22] Filed: Jul. 16, 1990

[30] Foreign Application Priority Data

Jul. 21, 1989 [JP] Japan .................................. 01-187348

[51] Int. Cl.$^5$ .............................................. B66B 25/00
[52] U.S. Cl. .................................... 198/322; 198/323; 198/810
[58] Field of Search ......................... 198/322, 323, 810

[56] References Cited

U.S. PATENT DOCUMENTS

| | | | |
|---|---|---|---|
| 3,580,376 | 5/1971 | Loshbough | 198/323 |
| 4,139,810 | 2/1979 | Ueki et al. | 198/323 |

FOREIGN PATENT DOCUMENTS

| | | | |
|---|---|---|---|
| 3611597 | 10/1987 | Fed. Rep. of Germany | 198/322 |
| 64781 | 5/1977 | Japan | 198/323 |
| 33484 | 3/1979 | Japan | 198/323 |
| 11402 | 1/1980 | Japan . | |
| 31769 | 3/1980 | Japan . | |
| 829 | 3/1984 | PCT Int'l Appl. . | |
| 2200225 | 7/1988 | United Kingdom . | |

*Primary Examiner*—Joseph E. Valenza
*Attorney, Agent, or Firm*—Antonelli, Terry Stout & Kraus

[57] ABSTRACT

This invention relates to an apparatus for controlling passenger conveyers, such as an escalator and a motor-driven passageway. The control apparatus according to this invention is made up of output device for maintaining the output signal from the computer in the state of the moment when a failure or abnormality is detected when said failure or abnormality is detected by devices for detecting a failure or abnormality of the computer. By the above arrangement, even if the computer fails or becomes out of order, the passenger conveyer operation is continued, and the passengers are prevented from falling down.

28 Claims, 13 Drawing Sheets

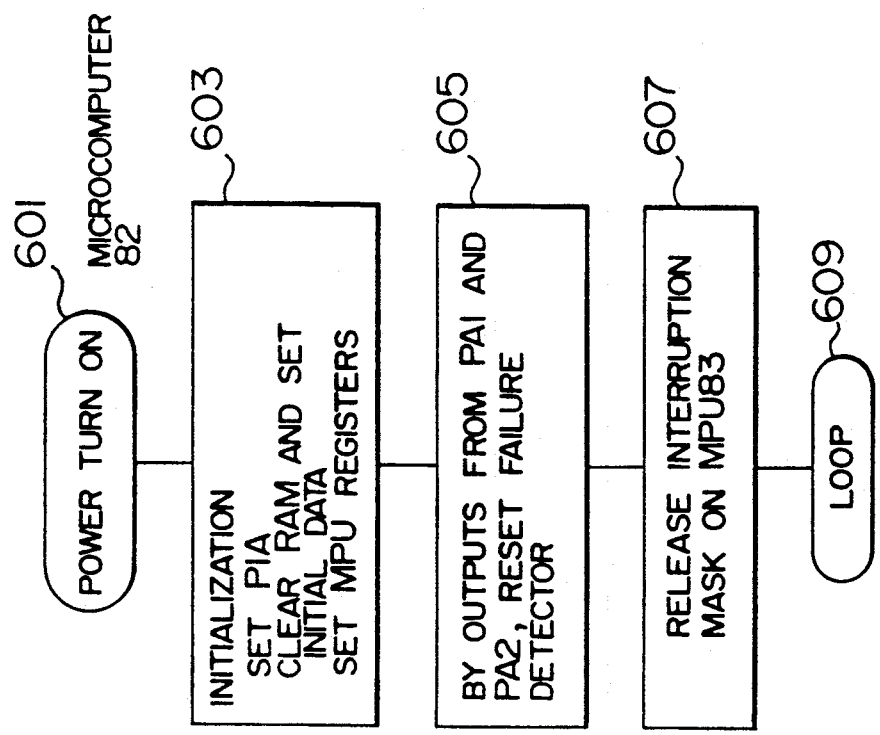
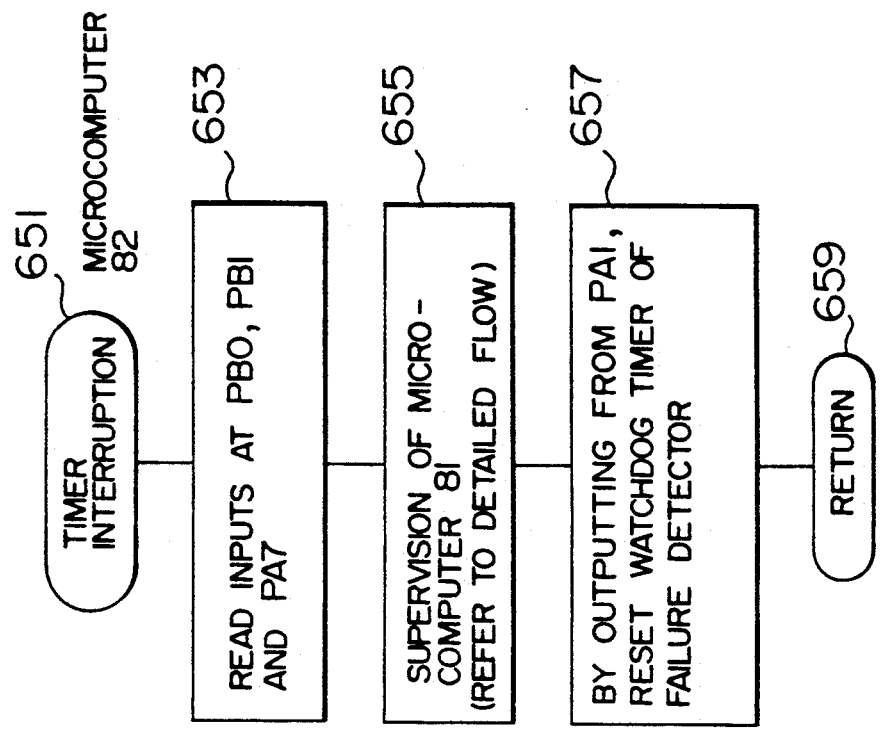

CONTROL APPARATUS FOR PASSENGER CONVEYER

BACKGROUND OF THE INVENTION

This invention relates to a control apparatus for controlling passenger conveyers such as escalators and motor-driven passageways by use of an electronic computer, for example a digital electronic computer.

Currently, the dominant control means for a passenger conveyer is a sequence control apparatus composed of relays. An example of the control apparatus formed by a digital computer is the "passenger conveyer safety equipment" disclosed in JP-A-55-11402. The prior-art control apparatus of this type which uses a digital electronic computer for the control of passenger conveyers will be described in the following discussion.

The control apparatus for a passenger conveyer whose stroke is inclined, that is to say, an escalator will be taken up as an example.

Referring to FIGS. 1 and 2, the escalator has driving sprocket 1 and a driven sprocket 2 installed in the top and bottom machine rooms R1 and R2, respectively. Footstep chains 3 are wound around the sprockets 1 and 2 to form endless loops. Footsteps 4 are attached in a line to the endless chain 3. This assembled body is driven by a driving machine 5 through an intermediary of driving chains 6 and the driving sprocket 1. A guide rail 7 guides the footsteps 4. Handrails 8, driven at the same speed as the footsteps 4, run on railings 9. The intermediate section between the footsteps 4 and the railings 9 is covered by skirt guides 10. On the other hand, the driven sprocket 2, pulled by springs 11, pulls the footstep chains 3.

In the escalators as described above, two sets of safety switches are provided, one for preventing passengers from being caught by the escalator and the other for securing safety for the passengers by stopping immediately when the machine breaks down.

The former safety switches are installed in the gap between the running section and the fixed section, in the regions where there occurs a difference in the relative motion of the footsteps, for example. The former safety switches include inlet switches 13 (four in total; at left and right of the top and bottom positions) which are actuated when a foot or a hand is drawn in at the inlet part 12 by the handrail 8; skirt guard switches 14 (four or more in total; at left and right of the top and bottom positions) are actuated when a foot or the like is caught between the skirt guard 10 and a footstep 4; and footstep safety switches 15 (two in total; at left and right of the top or bottom position) are actuated when a foot is caught by the relative motion of the footsteps 4.

The latter safety switches include a speed governor switch 21 which is actuated when the escalator exceeds a speed limit, a driving chain safety switch 22 which is actuated when the driving chain 6 breaks or is expanded over a specified value, and footstep chain safety switches 23 (two in total; at left and right). The footstep chain safety switches are provided to detect an abnormality in which the footstep chains 3 are elongated, reducing the tension by the springs 11 to less than a predetermined value, making it impossible for the footsteps 4 to keep the predetermined space therebetween, to detect that a foreign substance is caught in the running path of the footsteps causing the chain 3 to be locked, and to detect that the chain 3 was broken.

In addition, emergency stop switches 31 and 32 are installed on the operation switch panels at the top and bottom positions of the escalator in order to effect artificially a stop in an emergency.

Further, on the operation switch panel are provided a switch for distinguishing between operating the escalator to move upwards and downwards and a switch for stopping the escalator, to be described later.

FIG. 3 is a general block diagram of a control apparatus to control the driving machine and switches. Electric power is supplied to the escalator through a circuit breaker 51, and led, through a termal relay 53 and contacts 55a, 57a of Up and Down change-over switches 55, 57, to the driving machine 5, in which the supply power is connected to a motor 59 and a brake 61. On the other hand, the power is supplied also to the control apparatus 63 through the circuit breaker 51. FIG. 4 is a detailed block diagram of the control apparatus 63.

Used as a digital electronic computer in FIG. 4 is a microcomputer. This microcomputer 81 is composed chiefly of a microprocessor (MPU) 83 as a central part, read only memory (ROM) 85, a random access memory (RAM) 87, peripheral interface adapters (PIA) 89, 91 and 93, and a clock pulse generator (CPG) 84 to provide clock pulses as a time base for operation timing of these devices.

A usable type of each of these devices is mentioned below and detailed description of them is omitted. For MPU 83, an HD6800 made by Hitachi can be used, and for PIA89, PIA91, PIA93, HD6821s made by Hitachi can be used. It ought to be noted that for ROM85 and RAM87, ordinary semiconductor memories are utilized, and for CPG84, an ordinary clock pulse generator is used. The operation of this CPG84 is such that clock pulses $\phi1$ and $\phi2$ are generated based on the frequency of a quartz oscillator, not shown, and when a source voltage, not shown, has become stable, the clock pulses $\phi1$ and $\phi2$ are provided to MPU83. Though not shown in FIG. 4, while the source voltage is not stable, reset signals are output to the respective devices to cause the contents of their registers to be initialized.

The general operation of the microcomputer 81 will now be described. When the source voltage for the microcomputer 81, clock pulses $\phi1$ and $\phi2$ are applied from CPG84 to the terminals $\phi1$ and $\phi2$ of MPU83, whereby MPU83 starts to operate, and MPU83 fetches an instruction and addresses involved in the instruction execution from ROM 85 in which the program is stored through an address bus 97 and a data bus 99 connected to terminals A and D of the devices. MPU83 decodes the instruction and executes processings according to the result of the decoding. The processings of MPU83 executes by reading data from RAM87 or a PIA or outputting data to those devices.

In the microcomputer 81, an additional timing signal is sent from the timer 101 to the IRQ terminal of MPU83, so that an interrupt occurs at the microcomputer 81 at fixed intervals, and each time an interrupt occurs, a particular program is executed. By counting the number of interrupts that have occurred, it is possible to know the elapsed time (time of the day).

What have been described are all directly connected to MPU83. The safety switches described earlier are connected to MPU83 indirectly through PIAs 89, 91, which will be described in the following.

A total of the 11 switches, including the skirt guard switches 14, inlet switches 13, driving chain safety switches 6, and footstep chain safety switches 23, are formed of differential transformers 107. The output of the differential transformers 107 is input to an analog multiplexer 109. To address inputs of the analog multiplexer 109 are connected outputs of the B port of PIA89. The analog multiplexer 109 selects the output of the 11 differential transformers 107 and inputs it to an A-D converter 113. The A-D converter 113 changes the analog input into digital signals. The A-D converter starts to convert analog signals into digital signals in response to a signal from the CA terminal of PIA89, and when the conversion is over, the converter in turn sends an end signal to the CA terminal of PIA89. When an end signal is sent to PIA89, normally the signal from the differential transformer 107 is stored once in RAM87 and then processed.

A switch 121 for upward movement, a switch 123 for downward movement, a stop switch 125 which have been mentioned before, an emergency stop switch 127, and the above-mentioned emergency stop switch 31 (one each of those switches is installed both at the top and bottom entrances, but only one each is illustrated as the representative ones.) and other switches 131, for example, are connected to the input terminal of PIA91.

The input of data to the microcomputer 81 has been described. As for the output, switches 55, 57 are connected with PIA93 through an output buffer 141. In addition, an alarm 143 for audible warning with lamp indication is connected to PIA93.

The microcomputer 81 periodically checks the ON/OFF states of the switches 107, 121, 123, ..., 131 on the input side, and if there is no abnormality, the microcomputer 81 does nothing, and if abnormality is detected, it de-energizes the switches 55, 57. In other words, the microcomputer 81 energizes or de-energizes the switches 55, 57 according to the roles of the switches, and it also controls the alarm 143.

SUMMARY OF THE INVENTION

In the prior art mentioned above, no consideration is given to a failure of the microcomputer, that is, to the detection of its abnormal operation that it does not perform a prescribed action due to a bug in software or a fault in hardware. Nor is consideration given to measures to take for such irregularities. The prior art tolerates abnormal actions which can occur, though not often.

To be more specific, if the microcomputer 81 fails, the escalator stops with people standing thereon, causing them to topple over like a line of dominoes.

As means for detecting a failure of the microcomputer, watchdog timers are generally used. As a prior art of this kind, there is disclosed in JP-A-55-31769 entitled "Elevator Control Apparatus" a technique by which to stop the vertical movement of the elevator cage when a failure detector using a watchdog timer is activated.

Therefore, if a failure detector of the above-mentioned JP-A-55-31769 is added to the prior art, it seems that necessary consideration may have been given to the above-mentioned problem because the escalator's movement is stopped by cutting off the power supply to the brake of the escalator machine so as to prevent the unnecessary actions such as a sudden stop of the escalator by an abnormal operation of the microcomputer and the running in the reverse direction after the sudden stop. Unlike with elevators, however, this method cannot be said to be perfect for escalators.

In other words, the escalator and the elevator move in different directions. The escalator and motor-driven passageway move people in the direction in which people are not supported, namely horizontally. In contrast, elevators move people vertically where they are supported by their feet. Therefore, if the escalator is brought to a stop, people are liable to fall down. Particularly, on the descending escalator, this is very dangerous because the passengers are most likely to fall down one upon another. As a countermeasure, JP-A-49-120378 entitled "A Stop Device for Man-Conveyers" discloses a method in which a brake is applied after coasting.

If this technique is applied, a possible method would be not to apply a brake of the escalator machine when the failure detector detects a failure of the microcomputer, but to apply the brake after the escalator is made to coast on momentum.

At any rate, the escalator finally comes to a stop. People must walk up or down the footsteps of the escalator. However, each step of the escalator is higher than that of ordinary staircases. Therefore, for a physically handicapped or elderly person, it is difficult to walk up or down the escalator to get out of it. This is more difficult with a long escalator moving people a great height.

Therefore, an object of this invention is to provide a control apparatus for passenger conveyers, which secures safety for the passengers by precluding the passenger conveyer from coming to a sudden stop, making it easy to get off the conveyer even if the computer for control of the passenger conveyer fails or malfunctions.

Another object of this invention is to provide a control apparatus for passenger conveyers, which does not bring the passenger conveyer to a stop even if the computer fails or malfunctions, but stops the passenger conveyer when a safety switch is activated.

A further object of this invention is to provide a control apparatus for passenger conveyers, which prevent people from getting on the passenger conveyer even if the conveyer is running so as to ensure safety when the computer fails or malfunctions.

Yet another object of this invention is to provide a control apparatus for passengers, which recovers the computer from abnormality so as to improve the availability of the passenger conveyer.

According to an aspect of this invention to achieve the above objects, a computer for control of a passenger conveyer comprises means for detecting a failure or abnormality, and output means for maintaining the output of the computer in the state of the moment when a failure or abnormal operation occurred.

According to another aspect of this invention, there is provided means for continuing the operation of the passenger conveyer when a failure or abnormality occurs in the computer for control of the passenger conveyer.

According to yet another aspect of this invention, there is provided means for stopping the driving machine of the passenger conveyer when a safety switch is activated while the computer is out of order or abnormal.

According to a still another aspect of this invention, there is provided means for notifying that the computer is in trouble or abnormal by the activation of failure or abnormality detecting means of the computer.

According to an additional aspect of this invention, there is provided means for recovering the computer from failure or abnormality.

For a while after a failure or abnormal operation has occurred, the computer keeps control signals to the driving machine as they are. When the failure detecting means detects a failure or malfunction, the output means keeps the output of computer in the state the moment when a failure or malfunction occurred that the output, that is, control signals do not change. Since the passenger conveyer has been operating normally before the failure or malfunction occurred, the normal operating condition continues regardless of the computer failure or malfunction. Therefore, the passengers do not fall one upon another, and there is no difficulty in getting off the escalator because they reach the entrance as they stay where they are.

When a safety switch is activated, the driving machine is made inoperative to stop the passenger conveyer immediately. Thus, the passengers are relieved from the dangerous condition.

Even though the passenger conveyer wherein some problem has occurred is still in motion, it is not desirable for people to get on such a conveyer. So, notifying means tells that the computer is out of order, thereby warning against riding the conveyer, so that the safety of the passengers is secured.

On the other hand, it is inconvenient to have the abnormal state continue, so that the computer is quickly recovered to the state before the failure.

BRIEF DESCRIPTION OF THE DRAWINGS

FIG. 13 is a schematic flowchart of the other microcomputer shown in FIG. 5;

FIG. 14 is a flowchart of a timer interrupt in the other microcomputer shown in FIG. 5.

DESCRIPTION OF THE PREFERRED EMBODIMENT

Figure 1:
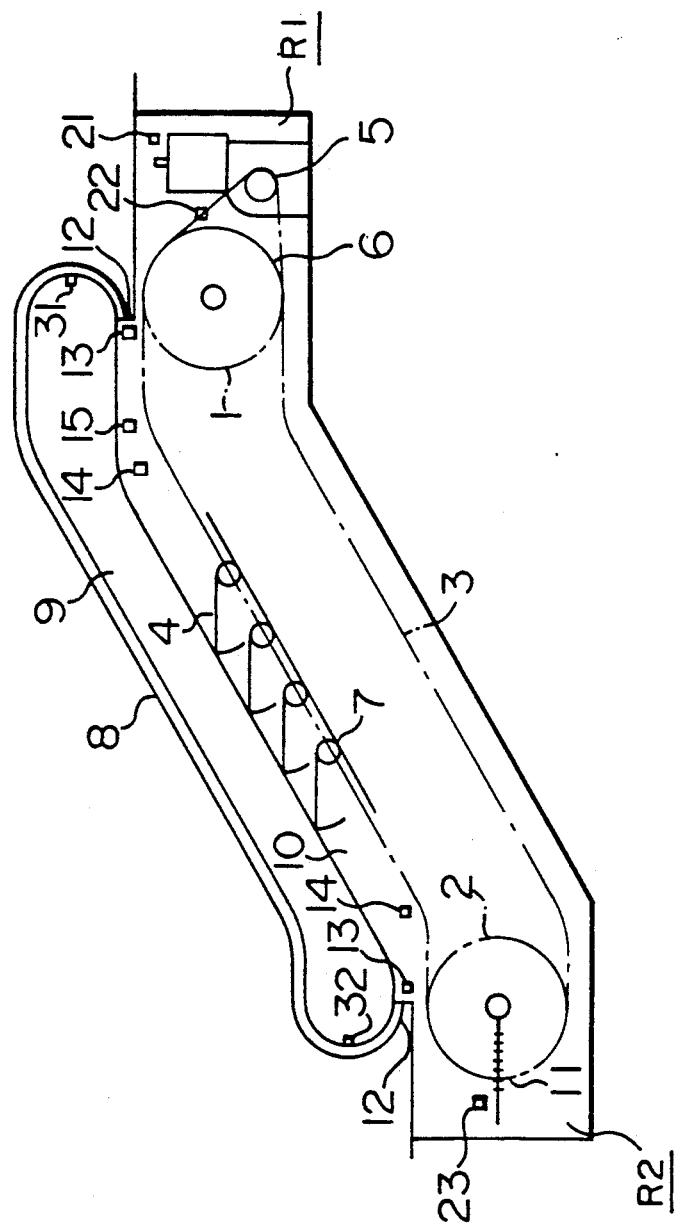
FIG. 1 is a schematic side view of the conventional escalator.
Figure 3:
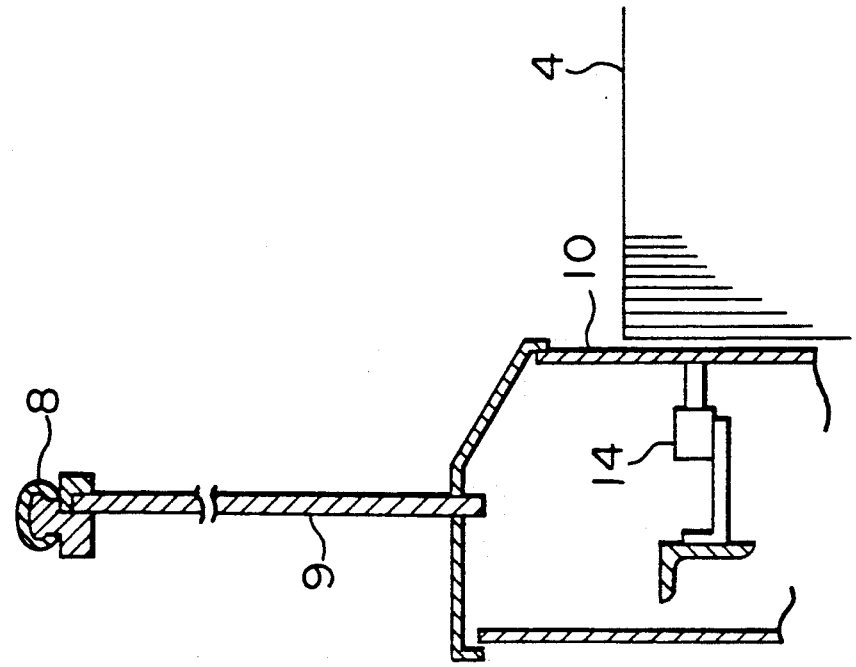
FIG. 3 is a block diagram showing the general configuration of the control circuit of the escalator of FIG. 1.
Figure 2:
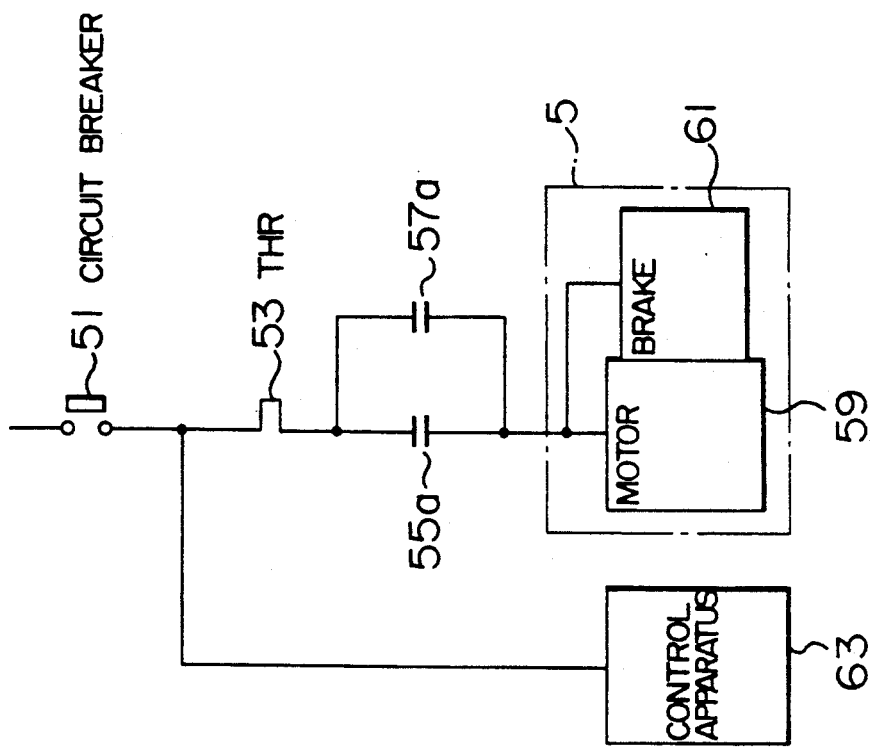
FIG. 2 is a sectional view of the skirt guard of the escalator of FIG. 1.
Figure 4:
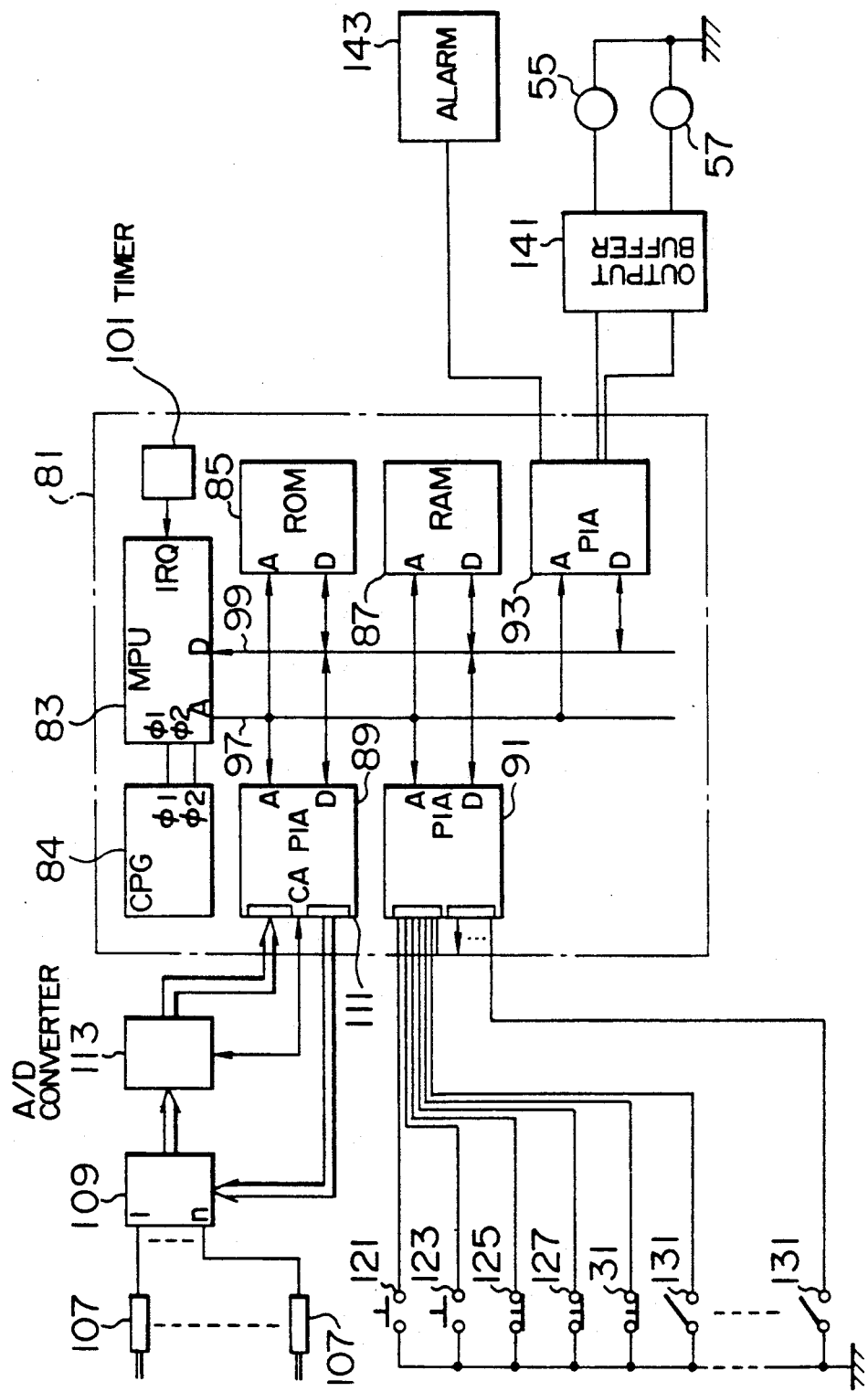
FIG. 4 is a detailed block diagram of the control apparatus shown in FIG. 3.
Figure 5:
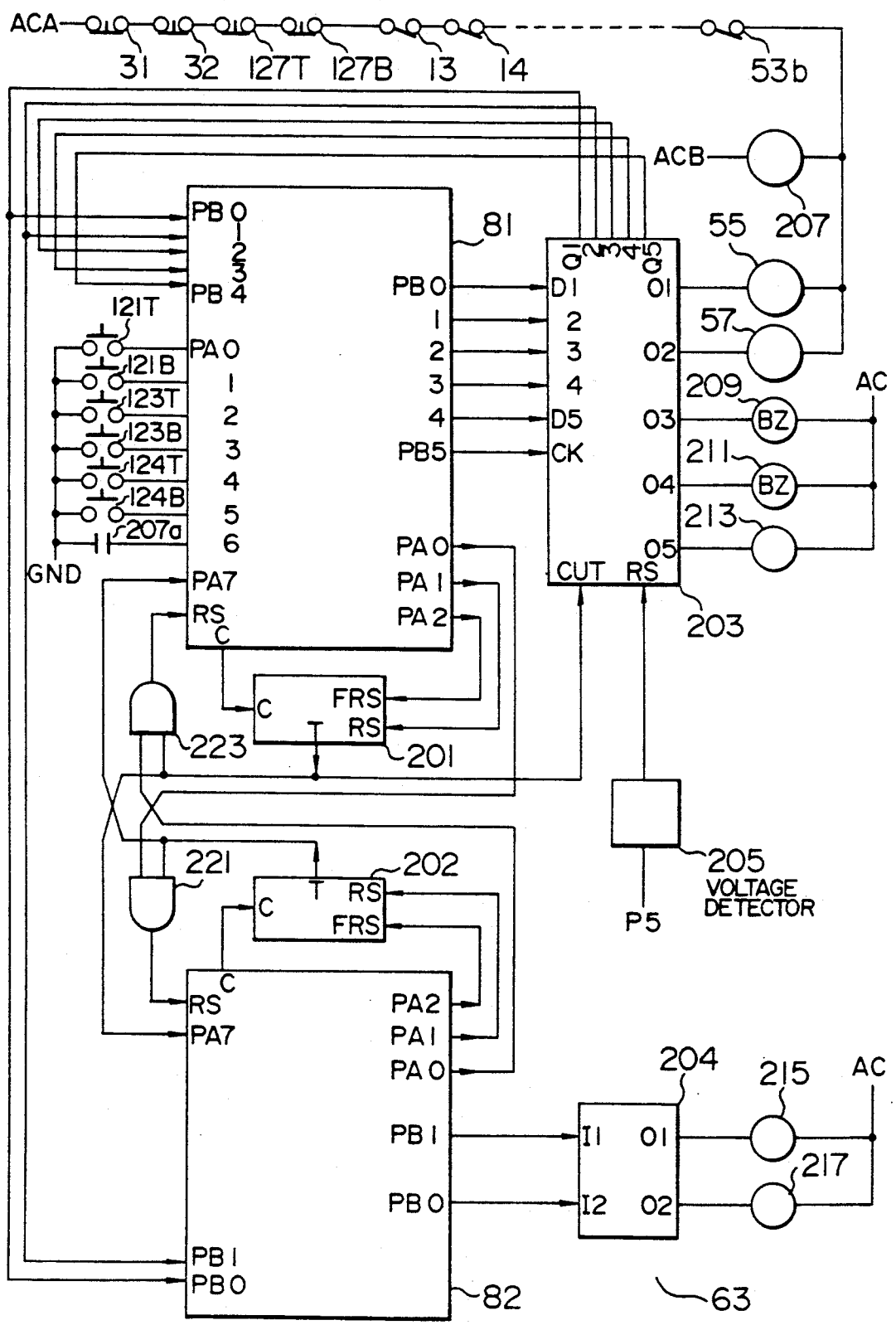
FIG. 5 is a detailed block diagram of the control apparatus of the escalator according to an embodiment of this invention.

An embodiment of this invention will be described in detail with reference to the accompanying drawings. In the description of this embodiment, those parts which are the same as those of the embodied example of the prior art and which have the same functions are designated by the same reference numerals. In the following description, the contents of FIGS. 1 to 3 are the same both for the embodied example of the prior art and the embodiment of this invention. However, since the control apparatus according to this invention is different from the one 63 of the prior art shown in FIG. 4, the control apparatus according to an embodiment of this invention is shown in FIG. 5.

The points of FIG. 5 different from FIG. 4 will be described in the following.

The microcomputer 81 has almost the same function as the one of the prior art. The control apparatus 63 according to an embodiment of this invention comprises not only this microcomputer 81 but also another microcomputer 82. The latter microcomputer 82 is used for recovery of the microcomputer 81 which has failed or malfunctions. Provided around the microcomputers 81, 82 are devices 201, 202 for detecting a failure or abnormal operation (hereafter the word "failure" is used to collectively describe both a failure and abnormal operation of the microcomputer), an output device 203, an output buffer 204, a voltage detecting device 205, and AND gates 221, 223. Further, a safety relay 207 is provided. In place of the alarm 143 for audible warning with a lamp indication, there are provided an alarm buzzer 209 installed in the top machine room R1 and an alarm buzzer 211 installed in the bottom machine room R2 of the escalator, and a failure indicator lamp to notify to the person in charge of maintenance of the escalator that the other microcomputer 82 has failed. Among the output signals from the other microcomputer 82 are one for a lamp-built-in audible alarm 215 installed at the top entrance of the escalator for warning people against riding the escalator when the microcomputer 81 is out of order, and another for a lamp-built-in audible alarm 217, the outputs to both alarms being provided through the output buffer 204. Another difference from the prior art is that a hand-operated stop switch and safety-device switches are connected in series with the Up and Down changeover switches 55, 57. More specifically, the emergency stop switches 31, 32, top stop switch 127T, bottom stop switch 127B, and the limit switches such as the inlet switch 13 and the skirt guard switch 14 are connected in series in that order as seen from the one terminal ACA of an AC power source. Further connected to these switches are the contacts 53b of the thermal relay 53, the safety relay 207, and the Up and Down change-over switches 55, 57.

Figure 7:
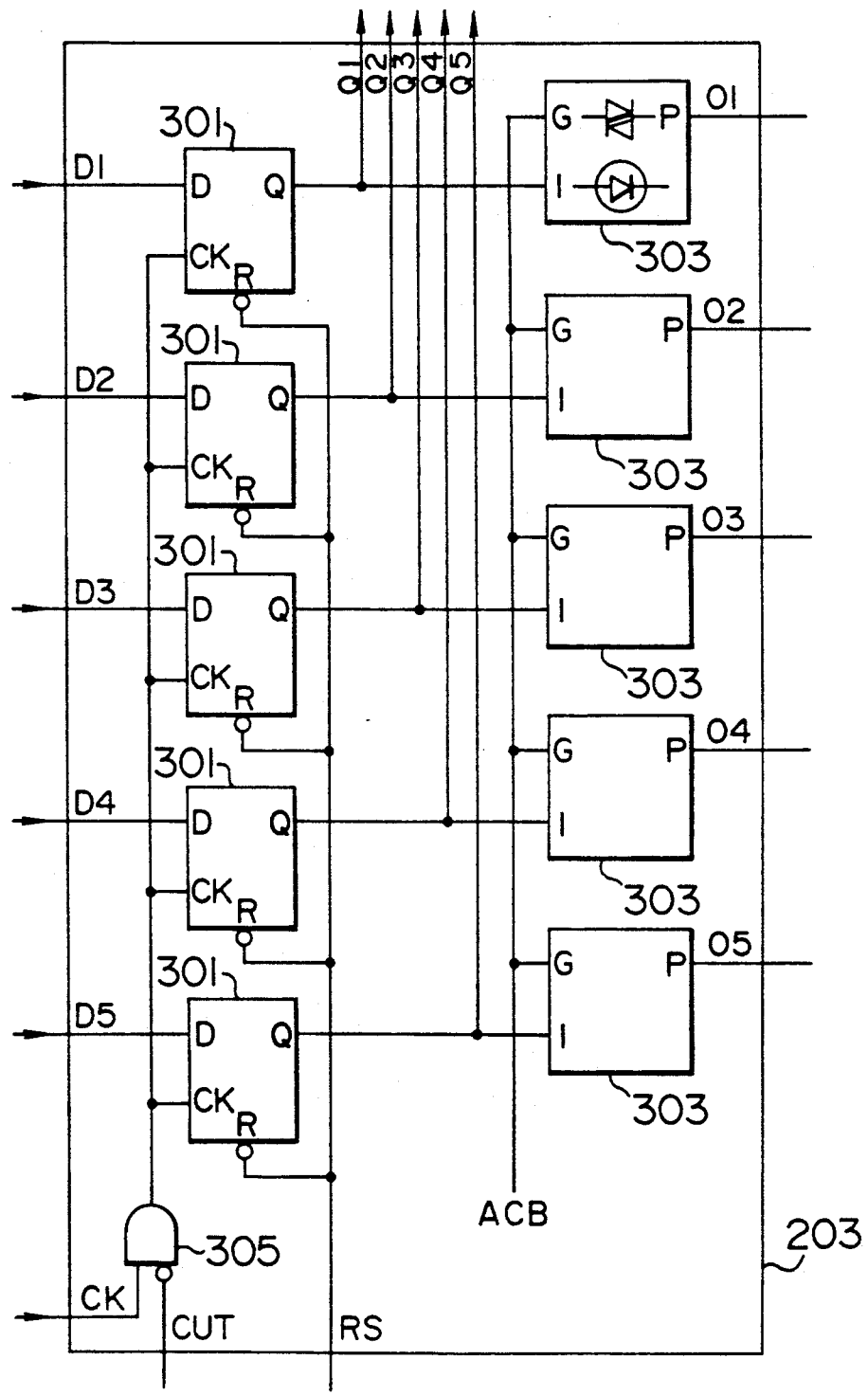
FIG. 7 is a detailed block diagram of the output device shown in FIG. 5.

The safety relay 207 is connected to the other terminal ACB of the AC power source, while the switches 55, 57 are connected through the output device 203 to the other terminal ACB of the AC power source, as shown in FIG. 7.

Therefore, the switches 55, 57 and the safety relay 207 are de energized when any safety switch is opened.

Output signals Q1 to Q5 from the output device 203 are connected to the inputs PB0 to PB4 of the microcomputer 81. Outputs Q1 and Q2 are also connected to the inputs PB0 and PB1 of the microcomputer 82. In addition, for input to the microcomputer 81, a switch 121T at the top entrance and a switch 121B at the bottom entrance, both used for an Up movement, a switch 123T at the top entrance and a 123B switch at the bottom entrance, both used for a Down movement, a switch 124T at the top entrance and a switch 124B at the bottom entrance, both included in the alarm switches to alert the people near the escalator when starting the escalator, are connected to the inputs PA0 to PA5. Contacts 207a of the safety relay 207 are connected to the input PA6 of the microcomputer 81.

The interconnections related to the microcomputers will be described in detail.

Figure 6:
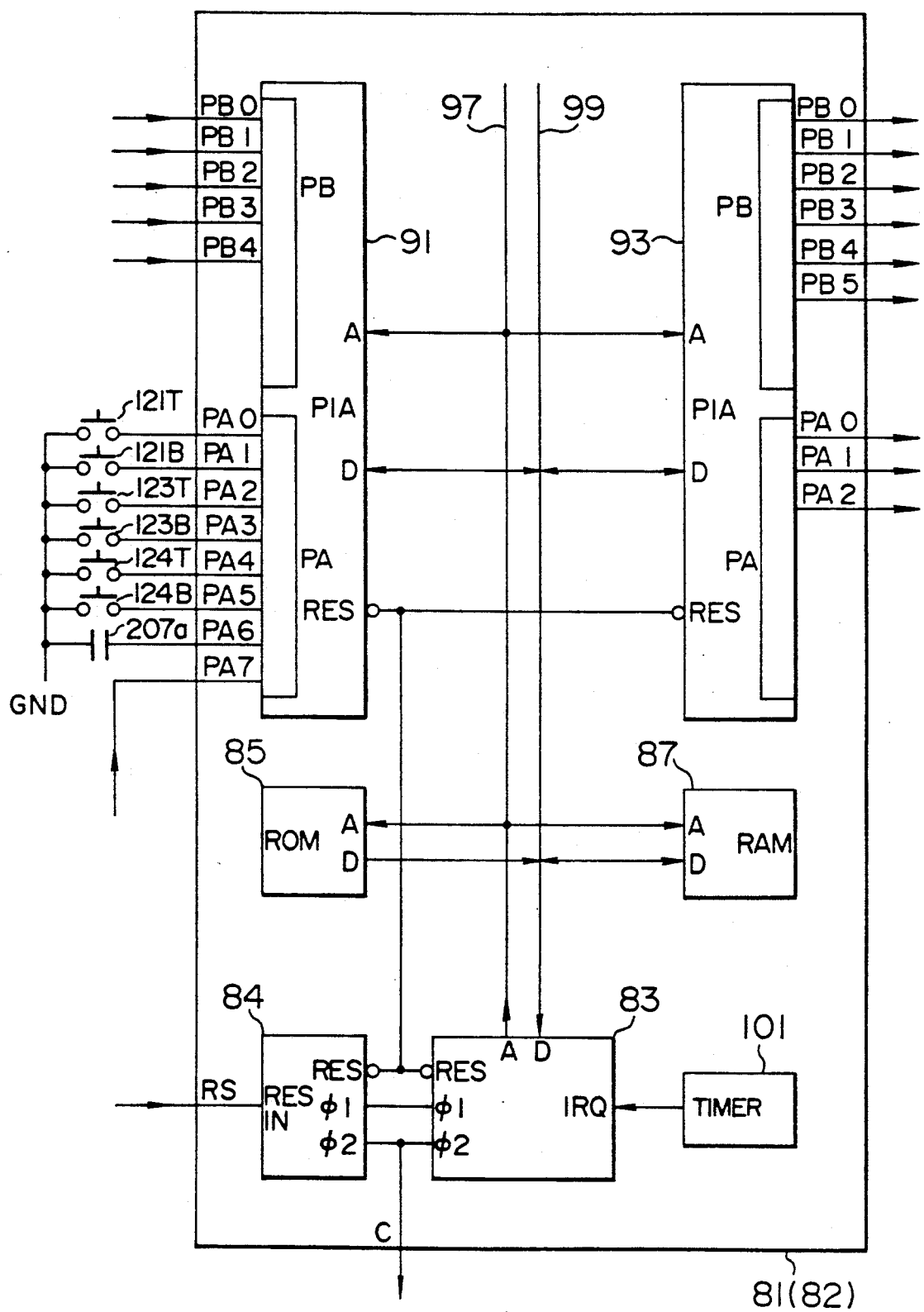
FIG. 6 is a detailed block diagram of the microcomputer shown in FIG. 5.

Referring to FIG. 6, a detailed block diagram of the microcomputer 81, detailed description will be made of the microcomputer 81 as well as the microcomputer 82. This microcomputer 81 is exactly the same as the one 81 in the embodied example of the prior art. Input terminal RESIN of CPG84 which generates a 1-MHz clock pulse for the microcomputer 81 is connected to the input RS of the microcomputer 81. A clock pulse output terminal $\phi 2$ is extended to the outside from the output C of the microcomputer 81. The reset terminal RES is connected to the reset terminals RES of CPG84, MPU83, PIA91, and PIA93. Since PIA89 is not used in this embodiment, it is not mentioned.

The usage of the input and output ports of PIA91 and PIA93 of the microcomputer 81 is different from that of the prior-art example. The usage of the input and output ports of PIA91 and PIA93 differs also from that of those of the microcomputer 82. How those inputs and outputs are to be used is programmable and is set by software, and they are the same in terms of hardware.

FIG. 7 is a detailed block diagram of the output device 203. The output device 203 is composed chiefly of five flip-flops FF301 and five solid state relays SSR303. Each FF301 stores a signal applied to the input terminal D when the clock pulse reaching the clock terminal CK changes from "0" to "1" to "0", and outputs the result from the output terminal Q. When "0" is applied to the input terminal R, the output is set to "0". The five input terminals R are connected to the RS line, and serve as the inputs RS of the output device, which are driven by an external signal.

In each SSR303, a built-in LED diode lights when a signal "1" is applied to the input terminal I. In accordance with this light, a built-in triac is turned on, short-circuiting the output terminals P and G, so that an AC current flows through the triac. The five output terminals G are connected to the other end ACB of the AC power source ACA. The other output terminals P are extended to the outside as outputs 01 to 05.

As for the relation between the input CUT and the clock input CK of the output device 203, when a signal "0" is applied to the input CUT, this signal is inverted by gate 305. Therefore, an input signal at the other input CK is output with no change from gate 305. The output from gate 305 is input to the input terminal CK of each FF301, and therefore, as the input signal at the inputs CK changes from "0" to "1" to "0", the signals of the inputs D1 to D5 to the output device 203 are stored as they are in the FF301s. When the input signal CUT becomes "1", this "1" is inverted to "0", so the clock pulse from the input CK cannot be output from gate 305, and the stored data in the FF301s are maintained as they are.

The output terminals Q of FF301 are connected to the input terminals I of SSR330s, and are also extended to the outside as outputs Q1 to Q5 from the output device 203.

Figure 8:
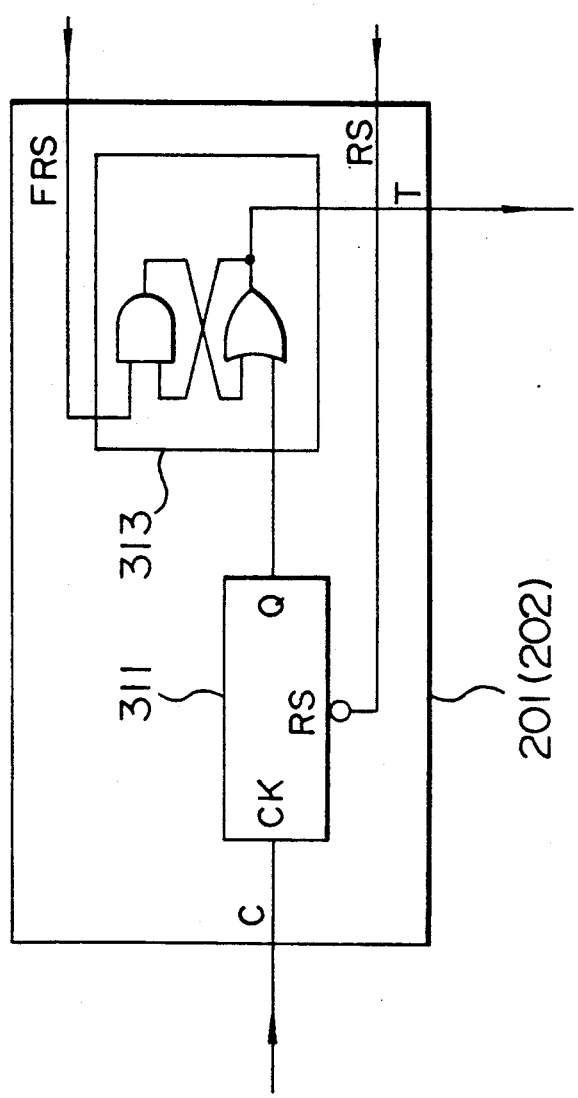
FIG. 8 is a detailed block diagram of the failure detecting device shown in FIG. 5.

FIG. 8 is a detailed block diagram of failure detectors 201 and 202. This device comprises a watchdog timer WDT311 and a set preferential FF313. The WDT311 outputs a signal "1" from the output terminal Q when it has counted a specified number of clock pulses entering through the input C of the failure detector 201. Normally, before a specified number of clock pulses has been counted, WDT311 is reset to "0" by a signal "0" applied to the input terminal RS of WDT311 through the input RS of the failure detector 201. Therefore, it follows that when "1" is output from the output terminal Q, the microcomputer is regarded as abnormal. When this output is input to FF313, the signal is output with no change to the outside as the output T of the failure detector 201. This output T is stored even if the output of WDT311 is "0" while the input FRS of the failure detector 201 is "1". However, when the input FRS becomes "0", "1" is output only when the output Q is "1".

With reference to FIGS. 5 to 8, the relation between the failure detectors 201, 202, and the microcomputers 81, 82 will now be described in a more general perspective. When the power is supplied to the whole system, before the voltage of the microcomputer power source P5 becomes stable, the output signal "0" from the output terminal Q of a voltage detecting device 205 is applied to the output device 203, so that all of the FF301 have been reset. Thus, the clock pulse $\phi 2$ of CPG84 is not yet generated as described earilier. When the voltage detecting device 205 detects that the power source P5 has risen to a sufficiently high voltage, the output Q of the voltage detecting device 205 becomes "1". From this moment, the clock pulse $\phi 2$ of CPG84 starts to be generated. The clock pulse $\phi 2$ is applied as input C to the failure detector 201(202), and is input to the CK input of WDT311, whereby the counter starts to operate. At this time, even if the failure detector 201 operates and "1" is output from the output T, since all FF301s have been reset before the power is supplied. The operation of the failure detector 201 has no effect on FF301s.

By the action of the clock $\phi 2$ of CPG84, the software starts to run. The failure detector 201(202) is reset by changing the output data at PA0 and PA1 from "1" to "0". When the escalator is put into operation, an interrupt is performed periodically by timer 101, and thereafter, a signal of "1"→"0"→"1" (a pulse with a cycle of 40 ms, for example) are output periodically from the output PA2 of the microcomputer 81(82). Therefore, WDT311 never completes the counting. Here, the period in which pulses are output from PA2 periodically is referred to as the first period. However, if the microcomputer fails for some reason, for example, if a signal of "0" stops coming in from the output PA2 for more than 60 ms, namely, the pulse from PA2 differs from the one during normal operation, WDT311 completes the counting for failure detection. As a result, a logic "1" is output from the output T. The period from when "1" is output from the output T is referred to as the second period. In the second period, there is no change in the output from PB0 to PB5 of PIA93. The signal from the output T is applied to the input CUT of the output device 203, thus prohibiting a change in the state of FF301s, so that the stored data is maintained.

Therefore, when the microcomputer 81 fails, before the third period begins in which the outputs from PB0 to PB5 are subject to change, the outputs from the output device 203 are maintained by the failure detector 201, so that the escalator does not stop. The passengers reach the exit and get off the escalator safely without knowing the failure of the microcomputer 81, and this precludes any danger.

The logic "1" of the output T continues until "0" is output from PA2 or the terminal Q of WDT311 goes to "0" level even if "0" is output from PA2.

After the failure detector of one microcomputer is activated, the process by which the other microcomputer acts as a recovery device is executed as follows. When by a signal applied to PA7 of the microcomputer 81(82), information is given that the other microcomputer 82(81) has failed; "1" is output from PA0. When the microcomputer 81 acts as a recovery device, this output is input into AND gate 221 (AND gate 223 when the microcomputer 82 acts as a recovery device), and if the failure detector 202(201) has detected the failure, the "1" is output from the gate 221(223) with no change, and enters the input RS of the microcomputer 82(81) to drive the input terminal RESIN of CPG84. In consequence, a signal "0" is output from the terminal RES of CPG84 to reset the respective devices. Thus, operation is started with initialization. In the same manner, the other microcomputer, too, acts as a recovery device.

The output buffer 204 incorporates SSR303, shown in FIG. 7, and the inputs I1 and I2 correspond to the input terminal I of SSR303, and the outputs O1 and O2 correspond to the output terminal P. When a logic "1" is output from PB0 or PB1 to the input I1 or I2, a lamp-built-in audible alarm 215 or 216 sounds.

When the output of the output device 203 is maintained in the state at the time of the failure occurrence by the action of the failure detector 201, if a safety switch is activated, the switches 55, 57 are de-energized as they do not have the AC power supplied as shown in FIGS. 5 and 7. As a result, the contacts 55a, 57a open, the motor 59 stops, the brake 61 is applied, thus bringing the escalator to a sudden stop to relieve the passengers from danger. The escalator can be stopped manually by using the switches 31, 32.

The operation by software will be described with reference to the flowcharts.

Figure 9:
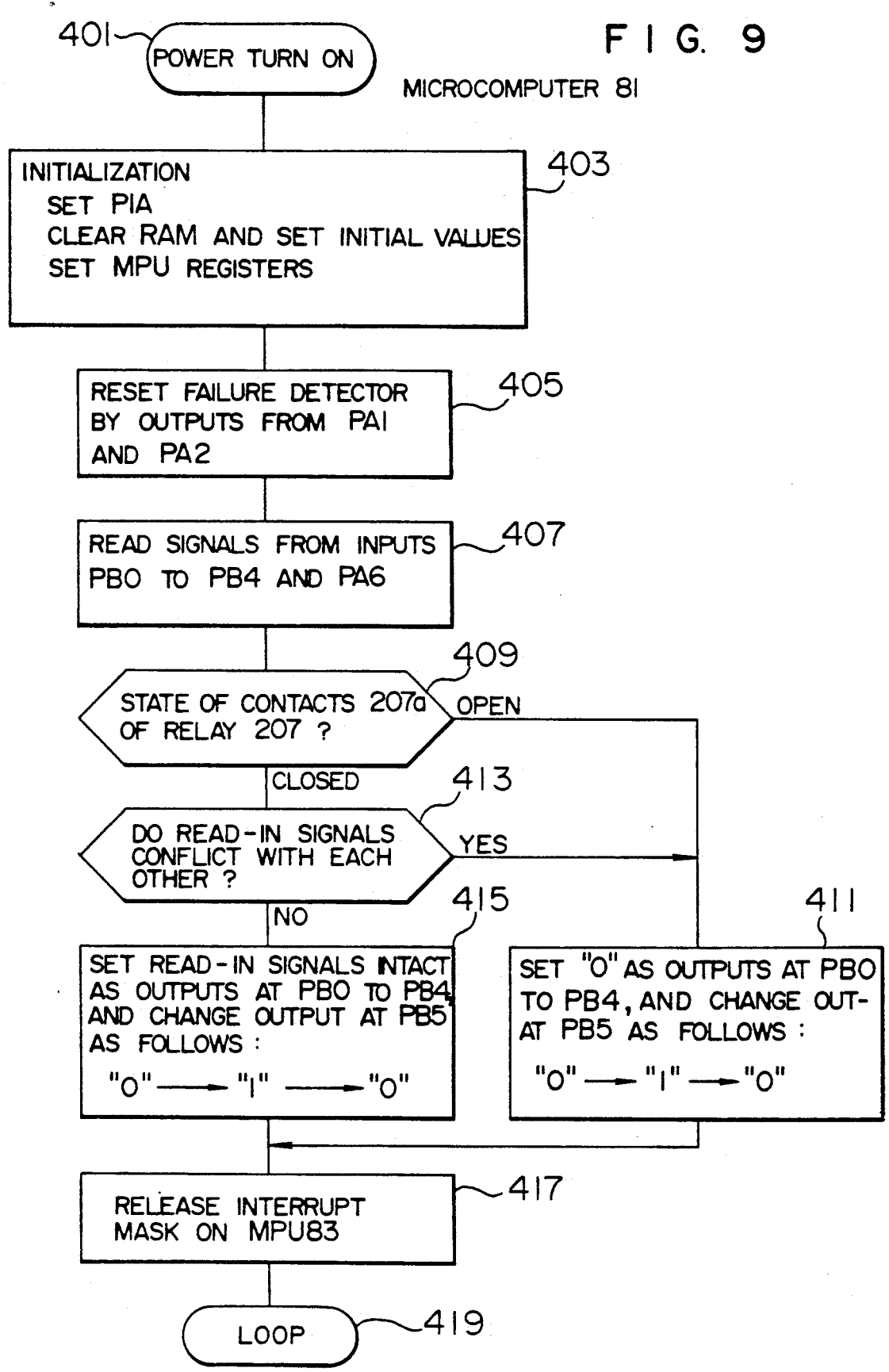
FIG. 9 is a schematic flowchart of the microcomputer shown in FIG. 5.

FIG. 9 is a program which is executed when power is applied to the microcomputer 81. The block 401 indicates turning on of the power. This program starts with applying power to the microcomputer, by which the signal of the input terminal RES of MPU83 becomes "1", that address of ROM85 where the program of the next block 403 resides is read, and the address number is set in the program counter of MPU83. Thus, the execution of the program is started at the next clock pulse.

In the block 403, the microcomputer is initialized. PA and PB ports of PIA91 are initialized at the input port, and they are kept as they are. PA and PB ports of PIA93 are set for output. Then, RAM87 is cleared, and set to a necessary initial value. A stack point is set for MPU83.

In the block 405, the failure detector 201 is reset. For this purpose, a signal that changes from "1" to "0" to "1" is output from PA1 at the PA port of PIA93 to reset WDT311 of the failure detector 201. A signal that changes from "1" to "0" to "1" is output from PA2 of the PA port to reset FF313 of the failure detector 201. Thus, the failure detector 201 has been reset.

In the block 407, signals are received through the input PB0 to PB4 of the PB port of PIA91 and PA6 of the PA port so as to be available in the subsequent program.

In the block 409, a check is made into the open/close condition of the contacts 207a of the safety relay 207, which provides an input signal to PA6. If the contacts 207a are open, it follows that any of the safety switches has been activated, or a stop switch has been operated. Therefore, for the escalator, the output signals should all be for its stoppage, and in the next block 411, the state of stop is established. If the contacts 207a are closed, the escalator is ready to operate, and the process moves onto the next block 413.

In the block 411, in order to create a stop state, "0" is set at PB0 to PB4 of the PB port of PIA93, and the output at PB5 is changed from "0" to "1" to "0". Thus, FF301s of the output device 203 all have "0" stored. The output T of the failure detector 201 has been reset to "0" at the block 405. The data storage mentioned above is possible. By this operation, the Up and Down switches 55, 57, the alarm buzzers 209, 211, and the failure indicator lamp 213 are all made inoperative.

When the contacts 207a are closed, on the other hand, none of the safety switches have been activated. In order to execute the next sequence, in the block 413, a check is made whether or not there is any contradiction among the signals that have been received. If both signals of the Up and Down changeover switches 55, 57 have been received, or if both the alarm buzzers 211 and 213 are sounding, it is considered that there is contradiction. If there is contradiction among the signals, the escalator must not be operated. So, the process proceeds to the above-mentioned block 411 so as to reset all the outputs. It ought to be noted that the above-mentioned situation does not occur in no other cases than abnormal operations of the microcomputer to be described next, the abnormal operations including a case where the hardware has been destroyed and a case where the output device 203 malfunctioned due to electrical noise. Normally, without the occurrence of contradiction, the process proceeds to the block 415.

In the block 415, the provided signals at the inputs PB0 to PB4 are transferred with no change to the outputs PB0 to PB4. The output at PB5 is changed from "0" to "1" to "0", by which the output data is stored and maintained in FF301s of the output device 203. This operation is not necessary for usual turning on of the power source since the output devices are inoperative at that time. However, this operation is effective in bring the microcomputer, which has failed, back to the state before the failure. The failures will be described later.

In the next block 417, the interrupt mask of MPU83 is released. As a result, by a signal from the timer 101, the program by a timer interrupt, to be described referring to FIG. 10, is started.

Finally, in the 419 block, a loop is formed to create a state in which no functional operation is performed. Thus, the program which is started when applying the power source is terminated.

Figure 10:
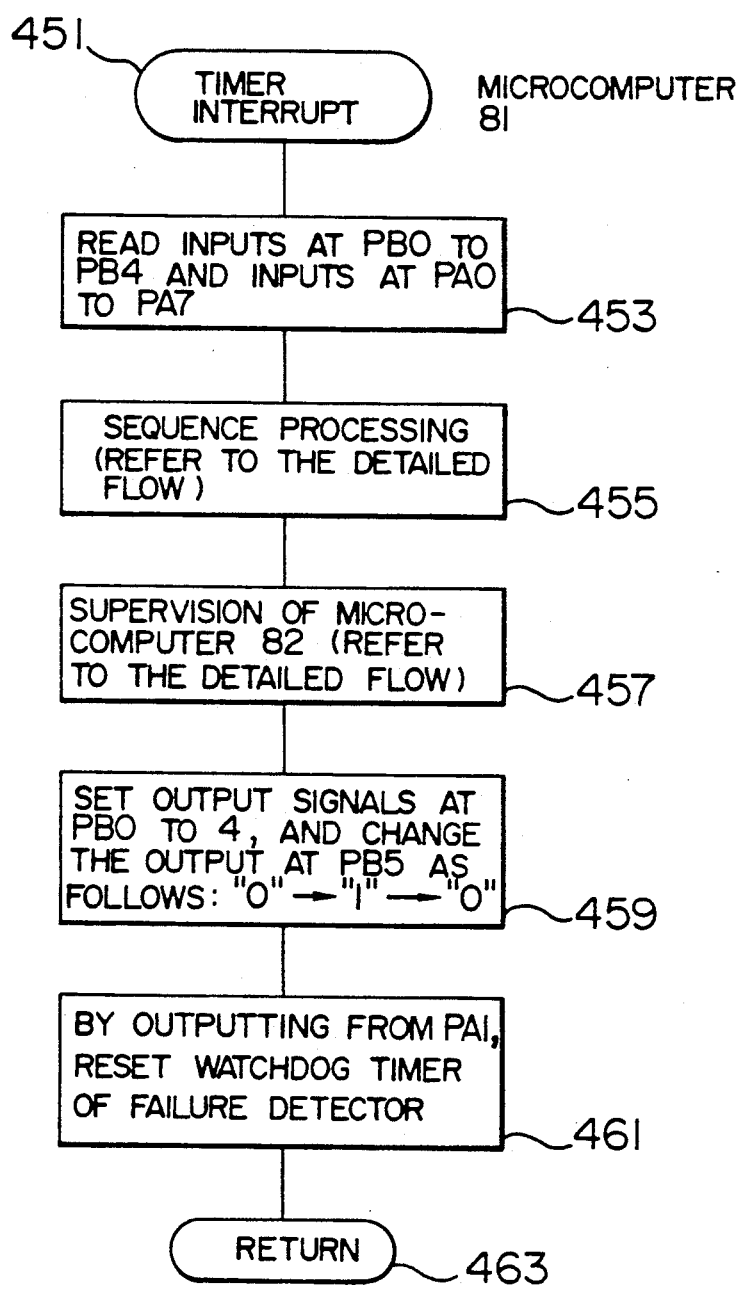
FIG. 10 is a flowchart of a timer interrupt in the microcomputer shown in FIG. 5.

FIG. 10 is a flowchart showing the general structure of the program which is started by a timer interrupt.

This program is started if there is a signal sent from the timer 101 when the interrupt mask is released in the block 417 of FIG. 9. This step is indicated by the terminal 451.

In the block 453, in order to read the current state of the escalator and an operation instruction to the escalator, the input signals at PB0 to PB4 of the PB port and at PA0 to PA4 of the PA port of PIA91 are read, and stored once in RAM87.

In the next block 455, the sequence according to the signals is executed, which will be described in detail with reference to FIG. 11.

In the block 457, an inspection is made if the other microcomputer 81 is operating normally. If abnormality is found, a necessary process is carried out. This process will be described in detail with reference to FIG. 12.

In the block 459, in order to output the collective results of the blocks 455 and 457, the output data are set at PB0 to PB4 of the PB port of PIA93, and as the output signal at PB5 is changed from "0" to "1" to "0", the data are stored in FF301s of the output device 203, and the respective output devices operate.

In the block 461, the last step of this timer interrupt processing, as the signal at PA1 of the PA port of PIA93 is changed from "1" to "0" to "1", WDT311 of the failure detector 201 is reset. The reason for resetting the failure detector 201 at the end of this program is that before the block 461 is executed, if the program runs away or a transitory electrical noise disturbed the execution sequence of the program, the resetting action cannot be carried out in the block 461. Therefore, WDT311 timer completes the counting (time is to be set in WDT311 so that this timer completes the counting in a time period a little longer than the interrupt interval from the timer 101), and "1" is output from the terminal Q. As a result, the output T from the failure detector 201 is "1", by which the failure is detected. This enables the failure to be detected with higher accuracy than the case in which the block 461 is executed before the block 453 of this program is carried out. The state of the signal from the output T tells whether or not the microcomputer is out of order. Likewise, if the hardware of the microcomputer fails, since the output T cannot be provided in the manner as described, the failure can be detected.

If the reset output from PA1 continues to be "0", WDT311 is unable to operate. As a countermeasure for this, if the output from PA1 is produced by using a one-shot multivibrator, WDT311 is reset only once when the output from PA1 is "1". This makes it possible to detect a failure more reliably. If a one-shot multivibrator is used to form the output of PA2, the output can be stored reliably.

The end terminal 463 indicates that the program started by timer interrupt ends. To be more specific, the program is terminated by an instruction such as RT1 (return from interrupt).

Figure 11:
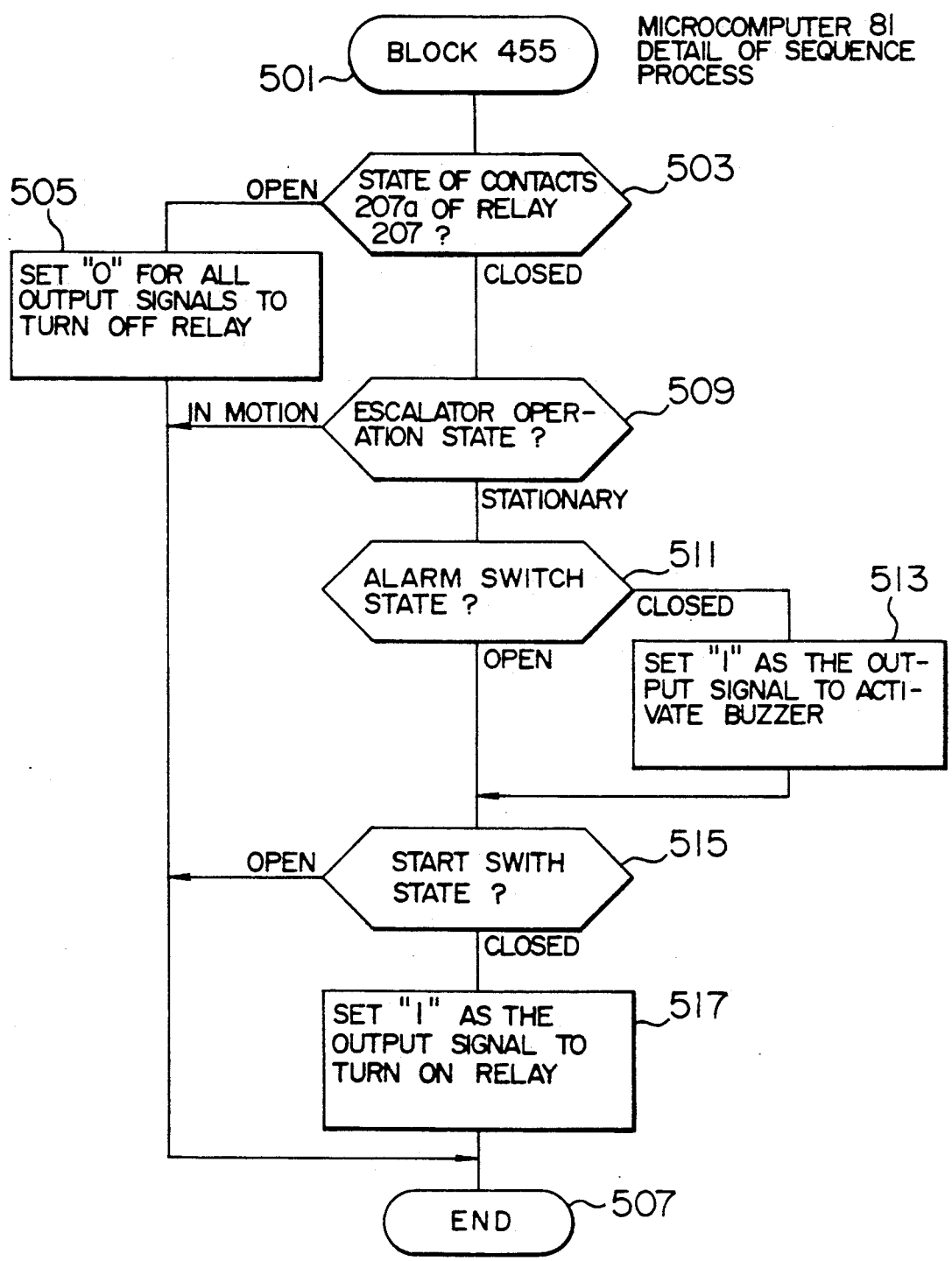
FIGS. 11 and 12 are detailed flowcharts of the flowchart of FIG. 10.

FIG. 11 is a detailed flowchart of the above-mentioned block 455. The terminal 501 indicates this block 455.

The next block 503 is for checking the open/close state of the contacts 207a of the safety relay 207 to see whether to stop the escalator because a safety switch is operated or a stop switch is activated. If the contacts 207a are found opened, in the block 505, all outputs are set to "0" like in the block 411 in FIG. 9 to make the output devices inoperative. The detailed program of the block 455 ends with the terminal 507. If the contacts 207a are closed, since this is normal, a check is made in the next block 509 to see which of the Up and Down change-over switches 55, 57 is turned on. If neither of them is turned on, this means that the escalator is stationary. In the block 511, a check is made to see if there is a request for start. If either one is turned on, this means that the escalator is in operation, and the situation is to be left as it is. This program ends with the terminal 507.

In the block 511, in order to start the escalator which has been stationary, a check is made of the condition of the alarm switches 123T and 123B to sound the alarm buzzer 211 or 213 for warning to the people around the escalator. If the alarm switch is turned on, it follows that an alarm buzzer is to sound. If the switch 123T at the top entrance is turned on, the output PB4 is set to "1" to activate the alarm buzzer 211 in the bottom machine room. If the switch 123B at the bottom entrance is turned on, the output PB3 is set to "1" to sound the alarm buzzer 209 in the top machine room.

Then, the process moves on to the block 515 which is executed also when an alarm switch is opened. In the block 515, a check is made whether or not the start switch for the escalator has been activated. If either of the switches 121T and 121B is closed, the output PB0 is set to "1" to move the escalator up. If either the switch 123T or the switch 123B is closed, the output PB1 is set to "1" to move the escalator down. Then, the Up and Down change-over switches 55, 57 are turned on. If the start switch is found opened in the block 515, since there is no request for operation, the program ends with the terminal 507. The outputs set as described are output collectively from the microcomputer in the block 459 of FIG. 10.

Figure 12:
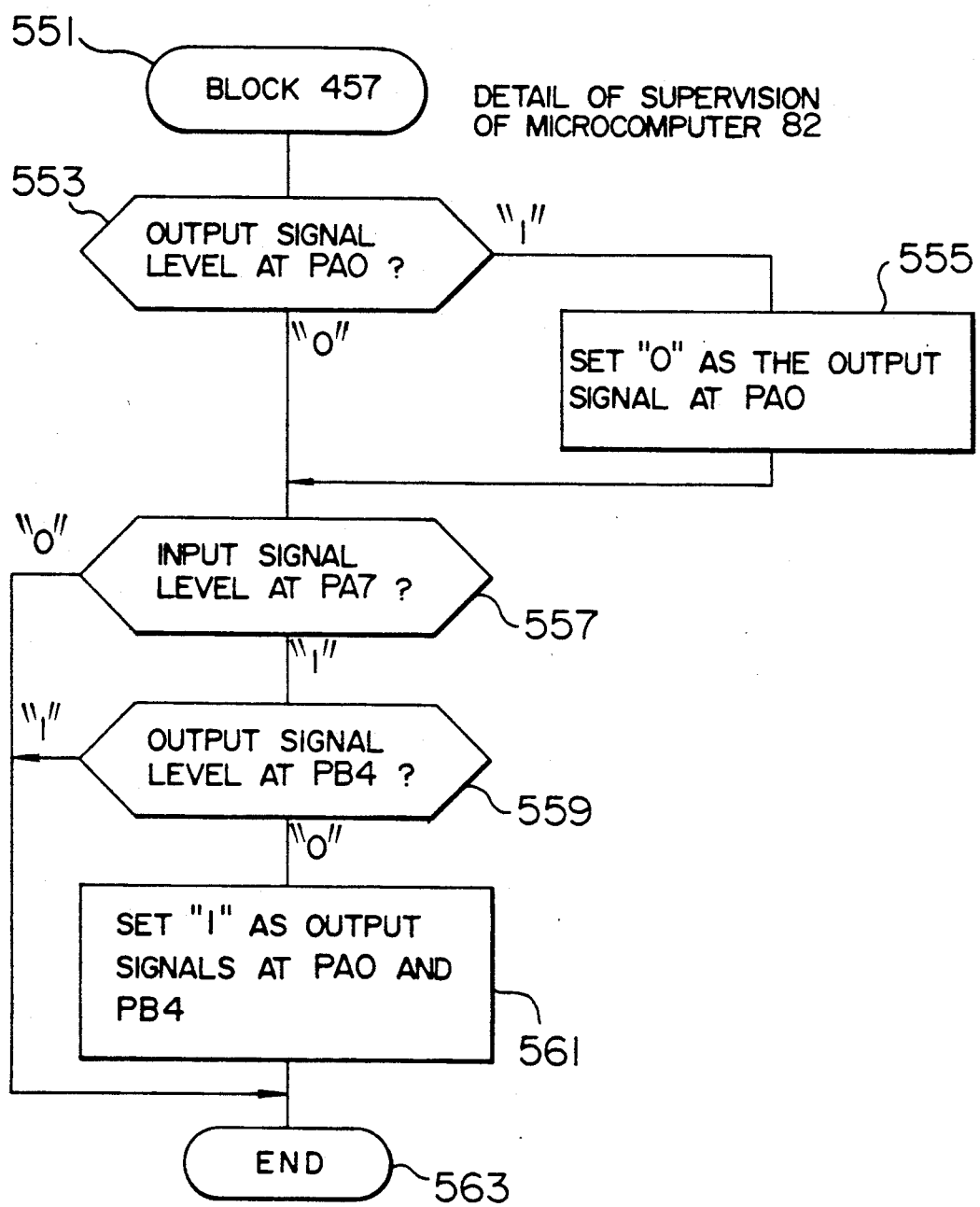

FIG. 12 is a detailed flowchart of the block 457 of FIG. 10, and shows the flow of a program to detect for abnormal operation of the other microcomputer, which is indicated by the terminal 551.

Though the block 553 comes first due to the execution sequence of the program, description will start with the next block 557.

The block 557 is a step to check if the microcomputer 82 is normal, and a normal/abnormal judgment is made according to the result of the output of the failure detector 202. In the block 557, if the signal of PA7 from the output T of the failure detector 202 is found to be "0", this is normal, and if so, the program ends with the terminal 563. If the signal is "1", the failure detector 202 has detected a failure, and to bring the microcomputer 82 back to normal state, it is necessary to make an retry to the microcomputer. Before the retry, in the block 559, in order to find if a failure has been detected in the execution of the programs up to the present, a check is made whether "1" has been set in the output PB4 (of the PB port of PIA93), which is a signal to light the failure indicator lamp 213. If the output signal is "1", this means that a failure has occurred before, and the program ends with the terminal 563 without further execution of the program.

If the output signal is "0", this means that the failure occurred for the first time, and a retry is made in the block 561. In order to output "1" from the output PA0 for a retry, "1" is set at PA0 of the PA port of PIA93. By this, "1" is input into gate 221. Since "1" from the output T of the failure detector 202 has been input into gate 221, "1" is output from gate 221, is applied to the input RS of the microcomputer 82, and is further applied to the input terminal RESIN of CPG84. When CPG84 finds that the signal has changed from "0" to "1", the output terminal RES is kept at "0" for a fixed time, thereby resetting MPU83, PIA91, and PIA93. After the passage of a fixed time, the program of FIG. 13, which is carried out in an ordinary power application to the microcomputer and will be described later, is executed to get back to the initialized state.

To notify the failure to the maintenance engineer, the failure indicator lamp 213 is lit, which is done by setting "1" at PB4 of the PB port of PIA93 and outputting the "1" in the block 459 of FIG. 10.

After the above process has been completed, the program of FIG. 12 ends with the terminal 563.

After the program has been executed as described, if this program is executed by the next timer interrupt, in the block 553 a check is made to see if the output PA0 for a retry to the microcomputer 82 has become "1" in the previous execution. If this output PA0 is found to be "1", which means that a retry has been applied, "0" is set at PA0 of PIA93 so that the output will be "0" in the block 555. By doing so, even if the failure detector 202 detects a failure again, a retry cannot be applied immediately, and therefore, it is possible to set a limit number of retries. In this embodiment, arrangement is made so that a retry is done only once. If the output PA0 is set to "0", the process proceeds to the execution of the block 557 as described.

FIG. 13 is a program which runs with power application to the microcomputer 82.

The terminal 601 indicates that the program starts with the application of power to the microcomputer. To be more specific, when power is applied to the microcomputer and the signal at the input terminal RES of MPU83 is "1", that address of ROM85 where the program of the next block 603 resides is read, the data is set in the program counter of MPU83, and the program starts to run at the next clock pulse. This operation is the same as in the microcomputer 81.

In the block 603, the microcomputer is initialized. Initial values are set for PA and PB ports at the input port of PIA91, and they are kept as they are. PA and PB ports are set for output in PIA93. Then, RAM87 is cleared, and necessary initial values are set therein. A stack point is set for MPU83.

In the next block 605 for resetting the failure detector 202, a signal which changes from "1" to "0" to "1" is output from PA1 at the PA port of PIA93 to reset WDT311 of the failure detector 202. Then, a signal which changes from "1" to "0" to "1" is output from PA2 at the PA port to reset FF313 of the failure detector 202. Thus, the failure detector 202 has been reset.

In the next block 607 for releasing the interrupt mask for MPU83, by a signal sent from the timer 101, the program by a timer interrupt is started.

Finally in the block 609, a loop is formed to create a state in which no functional operation is performed. Thus, the program which is started when applying power to the microcomputer is finished.

FIG. 14 is a flowchart showing the general structure of the program which is started by a timer interrupt.

This program is started by a signal which is given by the timer 101 when the interrupt mask is released in the block 607 of FIG. 13, which is indicated by the terminal 651.

In the block 653, to find the state of the microcomputer 81 under supervision, signals entered in PB0 and PB1 of the PB port of PIA91 and in PA7 of the PA port are read, and stored in RAM87 so as to be readily available.

A check is made if the other microcomputer 81 charged with sequence control is operating normally. If the microcomputer is found abnormal, necessary processing is performed. This abnormal operation detection will be described in detail later when referring to FIG. 15.

In the final block 657 for a timer interrupt, a signal is changed from "1" to "0" to "1" at PA1 of the PA port of PIA93, WDT311 of the failure detector 202 is reset. The reason for resetting the failure detector 202 at the end of this program is as described about the flowchart of the microcomputer 81.

The final terminal 659 indicates that the program started by a timer interrupt is terminated.

Figure 15:
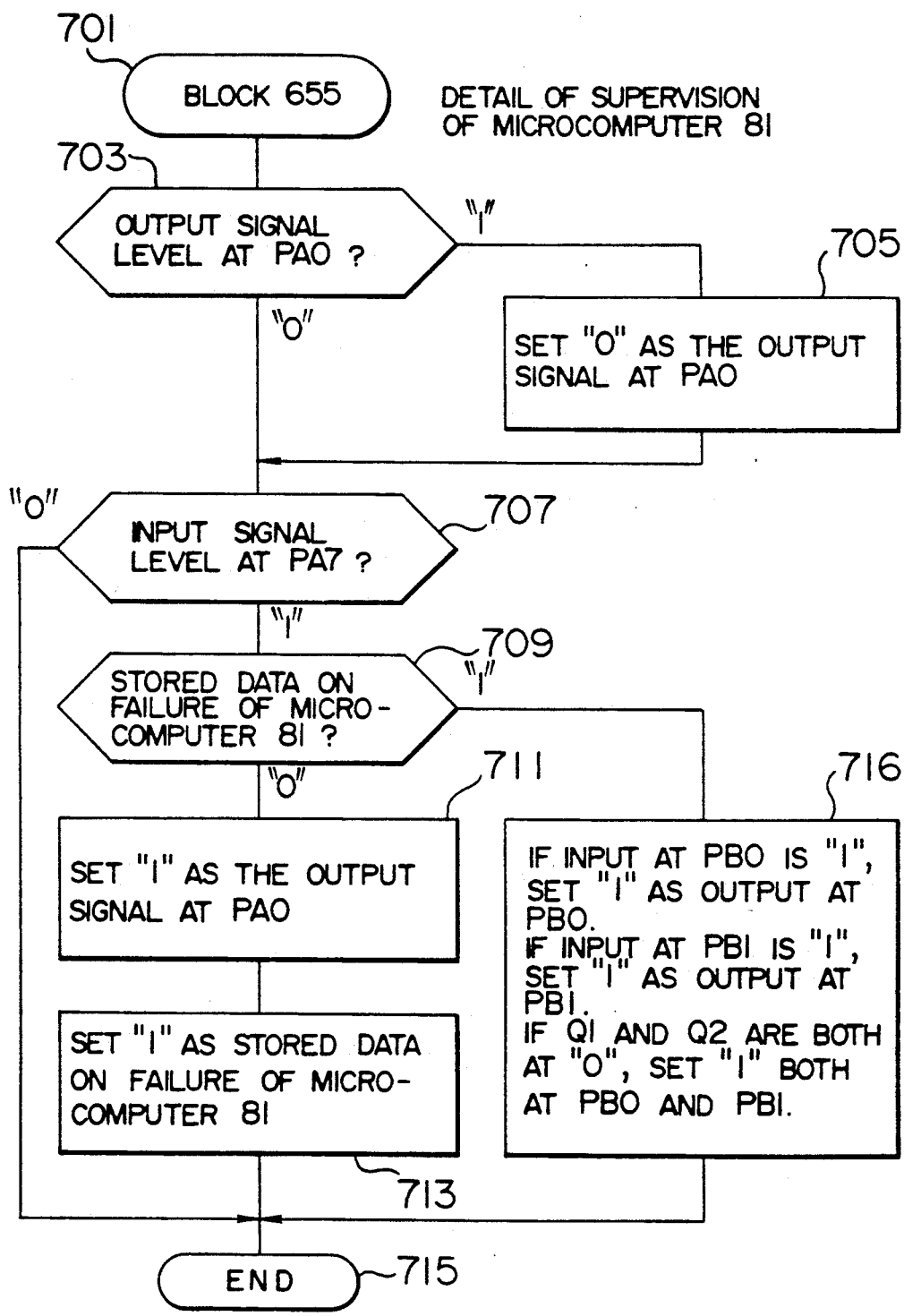
FIG. 15 is a detailed flowchart of the flowchart of FIG. 14.

FIG. 15 is a detailed flowchart of the above-mentioned block 655. This flowchart shows the abnormality detection program of the other microcomputer 81 as indicated by the terminal 701.

Though the block 703 is the first step of the execution sequence of the program, description will start with the next block 707.

In the block 707, a normal/abnormal judgment is made according to the output result of the failure detector 201. If the signal at input PA7 sent from the output T of the failure detector 201 is "0", this is normal. If this is the case, the program ends with the terminal 715. If the signal is "1", this means that the failure detector 201 has detected a failure. To bring the microcomputer 81 back to normal state, it is necessary to make a retry to the microcomputer 81. Before doing a retry action, in the block 709, a check is make to see if "1" has been stored in RAM87 to make sure that a failure has been detected in the execution of the programs so far.

If "1" is found to have been stored, this means that a failure has occurred before, the process moves on to the block 716. If "0" is present in RAM87, this means that a failure has occurred for the first time, and a retry is made in the block 711. In order to output a signal of "1" from the output PA0 for a retry, "1" is set at PA0 of the PA port of PIA93. By this, "1" is input into gate 223. Since "1" from the output T of the failure detector 201 has been input into gate 223, "1" is output from gate 223, is applied to the input RS of the microcomputer 81, and is further applied to the input terminal RESIN of CPG84. When CPG84 finds that the signal has changed from "0" to "1", the output terminal RES is kept at "0" level for a fixed time, thereby resetting MPU83, PIA91, and PIA93. After the passage of the fixed time, the program of FIG. 9, which is executed in an ordinary power application to the microcomputer, is performed to go back to the initial condition.

Then, the above-mentioned failure signal of "1" is stored in RAM87 in the next block 711.

After the above steps have been executed, this program ends with the final terminal 563.

After the program has been executed as described, if this program is executed by the next timer interrupt, in the block 703 a check is made to see if the output PA0 for a retry to the microcomputer 81 has become "1" by the previous execution. If a retry has been applied, "0" is set at PA0 of PIA93 so that the output will be "0" in the block 705. By doing so, even if the failure detector 201 detects a failure again, a retry cannot be applied immediately, and therefore, it is possible to set a predetermined number to limit the number of retries. In this embodiment, arrangement is made so that a predetermined number of retries is one and a retry is done only once. If the output PA0 is set to "0", the process moves on to the execution of the block 707. Supposing a retry has been applied in the previous execution, if the microcomputer 81 is recovered to normal state by this point of time in the next execution, the output T of the failure detector 201 will have become "0", and therefore, the input PA7 is "0". If this is the case, the program ends with the terminal 715.

However, if the microcomputer does not recover to normal quickly because of a failure in the hardware or the microcomputer malfunctions owing to a failure in the software or electrical noise, the output T of the failure detector 201 is "1", and the process moves on to the next block 709. Even though the failure has been corrected before the next execution of the program, if electrical noise enters again, or if the same part of software where there is a bug is executed again, the same failure occurs. At this time, the output T is "1", and the process proceeds to the execution of the block 709.

As described, if a failure has occurred before in the previous or earlier execution, in the block 709, "1" is stored as the memory of a failure before. In this case, the process goes to the block 716.

In the block 716, a check is made of the condition of the escalator when a failure occurred, and an adequate failure indication is made. When the output Q1 of the output device 203 is "1", the input PB0 (at the PB port of PIA91) of the microcomputer 82 is "1". At this time, the Up movement switch 55 has been activated. To warn people against riding the escalator with the audible alarm with an indicator lamp 217 at the bottom entrance, "1" is set at PB0 of the PB port of PIA93, so that the output at PB0 is made "1". By this, this output is sent through the output buffer 204 to the audible alarm with an indicator lamp 217 at the bottom entrance to activate the alarm.

When the output Q2 of the output device is "1", the input PB1 (at the PB port of PIA91) of the microcomputer 82 is "1". In this case, the Down movement switch 57 has been activated. Therefore, to warn people against riding on the escalator with the lamp-built-in audible alarm 215 at the top entrance, "1" is set at PB1 of the PB port of PIA93, so that the output at PB1 is made "1". Thus, this output is sent through the output buffer to the lamp-built-in audible alarm 215 at the top entrance to activate the alarm.

When both outputs Q1 and Q2 of the output device 203 are "1", the escalator is stationary. To prevent people from entering the escalator through the top and bottom entrances, the alarm indication is given at both entrances. To this end, "1" is set both at PB0 and PB1 of the PB port of PIA93, by which the outputs PB1 and PB2 are made "1". By this action, the output is transmitted through the output buffer 204 to the top and bottom entrances to activate the lamp-built-in audible alarms 215, 217. Finally, the program ends with the terminal 715.

Description will now be made of the comprehensive operations including hardware and software.

In description of the flow of the software, for simplicity sake, when referring to the blocks of FIGS. 9 to 15, only the numbers will be quoted, and the word "block" will be omitted.

1. Operation when applying the power source

When turning on the power to the control apparatus 63, "0" is output from the voltage detecting device 205 to the input RS of the output device 203 until the voltage of the power source P5 for the microcomputer rises. When the source voltage has risen sufficiently, the output Q of the voltage detecting device 205 goes to a logic "1". Therefore, the contents of FF301s of the output device 203 are all reset to "0". Likewise, for a predetermined time period since the source voltage has risen, (during this time period, the input RS of the microcomputer 81, namely, the signal at the input terminal RESIN of CPG84 is ignored), CPG84 outputs a "0" signal from its output terminal RES, thereby resetting MPU83, PIA91, and PIA93, and initial values determined by the hardware are set at the internal registers. With the passage of the fixed time, this signal changes from "0" to "1". By this time, clock pulses from the output terminal φ1 and φ2 of CPG84 have been entered into the input terminals φ1 and φ2 of MPU83. Therefore, from the moment when the signal changes to "1", the microcomputer starts to operate. What are run in the first place are the microcomputer initialization programs shown in FIGS. 9 and 13. To be more specific, the procedure to be executed in the microcomputer 81 are: FIG. 9, terminal 401-403 (initialization)—405 (resetting the failure detector 201)-407 (reading the input-)—409 (stop detection)—413 (signal check)—415 (setting a current-state-maintaining signal)—417 (releasing the interrupt mask)—419. Therefore, since FF301s of the output device 203 have been set to "0" when the power is turned on, all output units have been made inoperative in the block 415.

After the interrupt mask is released, the program of FIG. 10 is started at each timer interrupt. At this time, the steps to be executed are: terminal 451-453 (reading the input)—455 (sequence process)—FIG. 11, 503 (stop detection)—509 (operation state detection)—511 (alarm detection)—515 (start detection)—terminal 507—FIG. 10, 457 (supervision of the other microcomputer-)—FIG. 12, 503 (retry detection)—557 (failure detection)—terminal 563—FIG. 10, 459 (output)—461 (resetting WDT)—terminal 463.

On the microcomputer 82, on the other hand, the program runs as follows: FIG. 13, 601—603 (initialization)—605 (resetting the failure detector 202)—607 (releasing the interrupt mask)—terminal 609.

After the interrupt mask is released, the program of FIG. 14 is started at each timer interrupt. At this time, the steps that are executed are: terminal 651-653 (reading the input)—655 (supervision of the other microcomputer)—FIG. 15, 703 (retry detection)—707 (failure detection)—terminal 715—FIG. 14, 657 (resetting WDT)—terminal 659.

2. Normal start and stop operations

Suppose the power source is applied and the operation is in progress as described above. Under this condition, if the alarm is activated at the top entrance and then, an Up movement instruction is given, the following program is executed.

(1) Activating the alarm switch 124T at the top entrance

By this switch action, the following program is executed: FIG. 10, terminal 451-453 (reading the input-)—455 (sequence process)—FIG. 11, 503 (stop detection)—509 (operation state detection)—511 (alarm detection)—513 (alarm output)—515 (start detection-)—terminal 507—FIG. 10, 457 (supervision of the other microcomputer)—459 (output)—461 (resetting WDT)—terminal 463. While the switch 124T is turned on, the alarm is sounding at the bottom entrance to alert the people near the escalator.

(2) Activating the switch 121T at the top entrance to give an Up movement instruction By this switch action, the escalator starts to move up. The steps that are executed are: FIG. 10, terminal 451—453 (reading the input)—455 (sequence process-)—FIG. 11, 503 (stop detection)—509 (operation state detection)—511 (alarm detection)—515 (start detection-)—517 (start output)—terminal 507—FIG. 10, 457 (supervision of the other microcomputer)—459 (output-)—461 (resetting WDT)—terminal 463.

When the escalator is started, the program operates as: FIG. 10, terminal 451-453 (reading the input)—455 (sequence process)—FIG. 11, 503 (stop detection)—509 (operation state detection)—terminal 507—FIG. 10, 457 (supervision of the other microcomputer)—459 (output)—461 (resetting WDT)—terminal 463. Once the escalator has started, the alarm switches and the start switches lose their effect, and the escalator enters into routine operation.

(3) Stop by the stop switch 127T at the top entrance

By this switch action, the escalator stops its upward movement. The program operates as: FIG. 10, terminal 451-453 (reading the input)—455 (sequence process)—FIG. 11, 503 (stop detection)—505 (stop operation)—terminal 507—FIG. 10, 457 (supervision of the other microcomputer)—459 (output)—461 (resetting WDT)—terminal 463. In this process, even if the microcomputer 81 does not take an action for a stop, the power supply to the Up and Down change-over switches 55, 57 is cut off, so that the escalator can be stopped reliably.

3. Operation when a safety switch is used

If the safety switch has been activated since the power was turned on, the program progresses as: FIG. 9, 401-403 (initialization)—405 (resetting the failure detector)—407 (reading the input)—409 (stop detection)—411 ("0" output)—417 (releasing the interrupt mask)—terminal 419. Thus, the output units are made inoperative from the beginning. This program is executed when a stop switch has been activated.

If a safety switch is activated after the power source is turned on, this operation is performed by executing the timer interrupt program of FIG. 10: terminal 451-453 (reading the input)—455 (sequence process)—FIG. 11, 503 (stop detection)—505 (stop operation)—terminal 507—FIG. 10, 457 (supervision of the other microcomputer)—459 (output)—461 (resetting WDT)—terminal 463. Thus, the escalator is stopped. This program is so constructed that a stop operation is carried out when a safety switch is activated irrespective of the escalator is stationary or in operation. Even if an operation signal is being applied to the output units from the output device 203, the escalator can be stopped reliably because the power to the Up and Down change-over switches 55, 57 are cut off. In this embodiment, the relay actions are held by the output device 203 according to a command from the microcomputer 81. If the output device 203 fails and an output signal is kept being sent, there is a possibility that the escalator starts when the safety switch is brought back to normal operating state. As a countermeasure, a method may be adopted in which this relay switch is held by the switches 55, 57 to prevent the escalator from starting when the safety relay is placed in a normal state.

4. Operation to recover the microcomputer 81 from a failure by a retry

When the block 461 cannot be executed because of a failure of the microcomputer 81, and "1" is output from the output T of the failure detector 201. This signal of "1" is transmitted to the input CUT of the output device 203 to prohibit the contents of FF301s from being changed, thereby preventing the malfunctioning microcomputer 81 from outputting incorrect signals. Therefore, the escalator can be operated continuously with the output signal unchanged from its state when the microcomputer malfunctioned. In addition, when a safety switch is activated, the escalator can be stopped as described above. The passengers on the escalator can be conveyed to the exit safely.

Furthermore, when the other microcomputer 82 detects the failure, it is possible to recover the microcomputer 81 from the failure by making a try to the latter. The program for this purpose runs as: FIG. 14, terminal 651-653 (reading the input)—655 (supervision of the other microcomputer)—FIG. 15, 703 (retry detection)—707 (failure detection)—709 (failure memory detection)—711 (retry output)—713 (failure memory)—terminal 715—FIG. 14, 657 (resetting WDT)—terminal 659. At this time, the microcomputer 81 starts with the execution of the program of FIG. 9. For example, if the microcomputer malfunctions owing to temporary electrical noise, the microcomputer, as a rule, will operate normally, after the noise disappears. Therefore, in the block 415, after the microcomputer is brought back to the normal state just before, the microcomputer executes the program of FIG. 10. In consequence, the people on the escalator are unaware of the failure, and conveyed safely to the exit.

On the microcomputer 82 which made a retry, at the next timer interrupt, the program runs as: FIG. 14, 651—653 (reading the input)—655 (supervision of the other microcomputer)—FIG. 15, 703 (retry detection)—705 (canceling a retry output)—707 (failure detection)—terminal 715—FIG. 14, 657 (resetting WDT)—terminal 659. Thus, the retry output is canceled, and the failure detector 201 is reset in the block 405 of FIG. 9. Then, the input "0" at PA7 is checked and judged normal in the block 707, thus terminating the program, leaving the failure to be stored in memory.

5. Operation when a failure judgment is made again under the condition of Item 4 above If recovery is not achieved by a retry and a failure occurs again, looking at the hardware aspect, it is impossible to write data into the output device 203 by the microcomputer 81. Also in this case, the output data of the moment when the failure occurred is maintained. Looking at the software aspect, the program operates as: from terminal 651 of FIG. 14, the program runs on the microcomputer 82—653 (reading the input)—655 (supervision of the other microcomputer)—FIG. 15, 703 (retry detection)—707 (failure detection)—709 (stored failure data detection)—716 (failure indication output)—terminal 715—FIG. 14, 657 (resetting WDT)—terminal 659. In this procedure, a failure is detected again, but in this embodiment, a retry can be made only once (to allow retry more than once, it is sufficient to add a program which counts the number of retries). Therefore, a failure is indicated at the entrances of the escalator in the block 716 to tell people not to use the escalator from this moment on. To be more specific, the escalator is not stopped by one failure, but an alarm is issued by the second failure (or the third failure) to prevent people from riding on the escalator. This makes it possible to avoid an emergency stop in the worst situation. An uninterrupted use of the escalator is also possible on the assumption that the worst situation will not occur, which will be described next.

6. Operation when a safety switch is activated under the condition of Item 5 above Also under the condition that the microcomputer 81 is out of order as mentioned above, if a safety switch is activated, the power supply to the Up and Down change-over switches 55, 57 is cut off, so that the escalator can be stopped. Therefore, when the escalator is in operation under the above-mentioned condition, there is no safety problem. The stop switches 127T, 127B are inserted into the circuit of the power source to the Up and Down change-over switches 55, 57, and the escalator can be stopped reliably under this condition.

7. Operation when the microcomputer 82 failed and is recovered by a retry

When the block 657 of FIG. 14 cannot be executed because of a failure in the microcomputer 82, the failure detector 202 detects the failure, and outputs a signal "1" from the output T. When the other microcomputer 81 detects this signal, it makes a retry to the microcomputer 82 to recover the latter from the failure. The program for this purpose includes a failure detection, followed by recovery by a retry, and operates as: FIG. 10, terminal 451-453 (reading the input)—455 (sequence process)—457 (supervision of the other microcomputer-)—FIG. 12, 553 (retry detection)—557 (failure detection)—559 (failure indication detection)—561 (retry output and failure detection)—terminal 563—FIG. 10, 459 (output)—461 (resetting WDT)—terminal 659. At this time, the microcomputer 82 starts with the execution of the program of FIG. 13. For example, if the microcomputer 82 malfunctioned due to temporary electrical noise, usually the microcomputer will operate normally after the noise disappears. So, the failure detector 202 is reset to enable the program of FIG. 14 to run.

The microcomputer 81 which made a retry operates at the next timer interrupt as follows: FIG. 10, terminal 451-453 (reading the input)—455 (sequence process)—457 (supervision of the other microcomputer)—FIG. 12, 553 (retry detection)—555 (releasing a retry output-)—557 (failure detection)—terminal 563—FIG. 12, 459 (output)—461 (resetting WDT)—terminal 463. When the retry output is released and the failure is reset in the block 605 of FIG. 13, the input "0" at PA7 is judged normal in the block 557 of FIG. 12, and the program ends, leaving the failure indicator lamp lighted. By so doing, at the next maintenance, the maintenance engineer will notice the lighted failure indicator lamp 213 and know the history of failure, and can take necessary remedial steps.

8. Operation when a failure occurred again under the condition of Item 6 above

The program starts with a timer interrupt indicated by the terminal 451 of FIG. 10, and progresses as: 453 (reading the input)—455 (sequence process)—457 (supervision of the other microcomputer)—FIG. 12, 553 (retry detection)—557 (failure detection)—559 (failure indication detection)—terminal 563—FIG. 10, 459 (output)—461 (resetting WDT)—terminal 463. Even if the microcomputer 81 detects a failure, it does not make a retry. If it is necessary to make a retry a number of times, it is sufficient to add a program for counting the number of retries. In the above-mentioned embodiment, in the microcomputer 81 which performs a sequence process, the failure detector 201 and the output device 203 are formed by discrete hardware, and the recovery device which issues a retry operation instruction to recover from a failure is formed by the microcomputer 81. If the recovery device is formed by discrete hardware, for example, the same effect can be electronic computer and includes a function of the recovery device which investigates output signals sent periodically from the output PA1 of the microcomputer 81 to detect a failure and performs a retry operation.

Even if the recovery device mentioned above is not provided, sufficient effects can be achieved only with the output device which maintains the output of the moment when a failure occurred. Needless to say, if the recovery device is added, in case a failure occurs, the microcomputer can be recovered from the failure without the passengers noticing the occurrence of the failure. In the method wherein safety switches are provided in the microcomputer, whereby the operation point is investigated, as described when the prior-art example was referred to, it is necessary to form a system which can be recovered immediately as in this embodiment, the provision of the recovery device offers significant effects.

As for the SSR303 of the output device 203 described above, only one SSR303 is provided for one output unit. However, if two SSR303s are provided in parallel (output buffers in parallel arrangement), the escalator is prevented from stopping when one SSR303 fails, making it possible to convey the passengers more safely.

In the embodiment described above, the output of the output device 203 is maintained in the state before the microcomputer 81 fails, thereby making invalid a judgment made by the microcomputer 81 that has failed. However, in case the basic operation of the escalator is not entrusted to the microcomputer, but only an additional function is entrusted to the microcomputer 81, the control apparatus may be arranged such that when a failure of the microcomputer 81 is detected, the output of failure judgment is cut and not transmitted.

This invention has been described referring to the escalator as an example, but this invention may be applied to motor-driven passageways, conveyers of fragile articles, etc.

According to this invention, if the microcomputer which is performing a sequence process of the passenger conveyer fails, before some unwelcome action, such as a sudden stop, is taken, the failure is detected, and the output signal before the failure can be maintained by the output device. This makes it possible to prevent the passenger from toppling one upon another by a sudden stop. In addition, physically handicapped and elderly persons on the escalator need not walk down with difficulty in the middle of the stopped escalator.

Furthermore, the following effects can be obtained.

1. In case the microcomputer fails, when a safety switch is activated, the escalator is stopped, the passengers are free from danger.
2. When a failure occurs, the escalator does not stop for the people riding thereon, but warning is indicated at the entrances for people going to ride, and an emergency situation that may happen after the failure can be avoided.
3. Since a device for recovery from failure is provided, the escalator can be recovered from failure, allowing preventive measures to take against emergency.
4. Moreover, after recovery from failure by use of the recovery device, it is possible to have the microcomputer continue its operation according to the signal before the failure, maintained in the output device. When a failure occurs, an alarm is not sounded and the function of the passenger conveyer is not stopped.

We claim:

1. A control apparatus for a passenger conveyer having an endless belt, a driving machine of said endless belt, and a first electronic computer for control of said driving machine, said control apparatus comprising:
output means for outputting, on the basis of signals from said first electronic computer, output signals which include a first output signal for controlling said driving machine;
detecting means for detecting an abnormality of said first electronic computer; and
said output means being responsive to the detection of said abnormality by said detecting means and for maintaining and transmitting, without any changes, said output signals occurring before said abnormality was detected.

2. A control apparatus for a passenger conveyer according to claim 1, wherein said detecting means includes a second electronic computer.

3. A control apparatus for a passenger conveyer according to claim 1, wherein said detecting means comprises a watchdog timer.

4. A control apparatus for a passenger conveyer according to claim 1, further comprising means for stopping said driving machine when a safety switch of said passenger conveyer is activated.

5. A control apparatus for a passenger conveyer according to claim 1, further comprising means for generating an alarm at entrances of said passenger conveyer when said detecting means detects said abnormality.

6. A control apparatus for a passenger conveyer according to claim 5, wherein said alarm means includes a second electronic computer.

7. A control apparatus for a passenger conveyer according to claim 1, further comprising means for generating a first recovery of said first electronic computer from a failure when said detecting means detects said abnormality.

8. A control apparatus for a passenger conveyer according to claim 7, wherein said detecting means generates a second output signal as said abnormality is detected and wherein after said first recovery of said first electronic computer from said failure by said recovery means, said second output signal of said detecting means is received by said first electronic computer, said second signal initiates a procedure for controlling the passenger conveyer for continuing the conveyer operation.

9. A control apparatus according to claim 7, further comprising means for maintaining the operation of the conveyer with the first output signal of said output means if said failure has not been corrected by said recovery means.

10. A control apparatus according to claim 9, wherein said recovery means executes a second recovery after said first recovery to recover said first electronic computer from said failure, said second recovery being executed a predetermined number of times.

11. A control apparatus according to claim 7, further comprising alarm means for generating an alarm at entrances of said passenger conveyer to warn people against using the passenger conveyer when the passenger conveyer has not been recovered from said failure by said recovery means.

12. A control apparatus according to claim 11, wherein said recovery means further comprises means for executing a second recovery after said first recovery, said second recovery being executed a predetermined number of times, and wherein said alarm means continues to generate an alarm at the entrances of the passenger conveyer when said computer does not recover from said failure by said recovery means.

13. A control apparatus according to claim 7, wherein said recovery means includes a second electronic computer.

14. A control apparatus according to claim 11, wherein a second electronic computer includes said recovery means and alarm generating means.

15. A control apparatus according to claim 1, wherein the passenger conveyer is selected from the group consisting of an escalator and a motor-driven passageway.

16. A control apparatus according to claim 1, wherein at least two output buffers of said output means are arranged in parallel.

17. A control apparatus for a passenger conveyer having an endless belt, a driving machine of said endless belt, and an electronic computer for control of said driving machine, said control apparatus comprising means for maintaining and transmitting, without any changes, a control signal to said driving machine of said computer occurring before an abnormality of the electronic computer when an output signal of a timer received by said electronic computer is changed from a normal operating condition to an abnormal operating condition.

18. A control apparatus for a passenger conveyer having an endless belt, a driving machine of said endless belt, and an electronic computer for control of said driving machine, said control apparatus further comprising means for maintaining and transmitting to said driving machine, without any changes, a control signal occurring before an abnormality when said computer becomes abnormal.

19. A control apparatus for a passenger conveyer having an endless belt, a driving machine of said endless belt, and an electronic computer for control, said control apparatus comprising means for invalidating a judgment result of said electronic computer after said electronic computer becomes abnormal.

20. A control apparatus for a passenger conveyer having an endless belt, a driving machine of said endless belt, and an electronic computer for control of said driving machine, said control apparatus comprising means for continuing the passenger conveyer operation without interruption of a control signal received by said driving machine for a first predetermined period of time after an abnormality of said electronic computer is detected.

21. A control apparatus for a conveyer having an endless belt, a driving machine of said endless belt, and an electronic computer for control of said driving machine, said control apparatus comprising means for continuing the conveyer operation without interruption of a control signal received by the driving machine for a first predetermined period of time after an abnormality of said electronic computer is detected.

22. A control apparatus for a passenger conveyer having an endless belt, a driving machine of said endless belt, and an electronic computer, said control apparatus comprising:
means for detecting an abnormal operation of said computer;
means for operating said driving machine by maintaining and transmitting a control signal of said electronic computer generated before the abnormal operation of said computer is detected; and means for stopping the operation of the passenger conveyer in response to output from said detecting means only by manual operation.

23. A control apparatus for a passenger conveyer as in claim 3, wherein said watchdog timer detects said abnormality by counting up to a first predetermined number.

24. A control apparatus as in claim 23, wherein said watchdog timer detects a normal condition by being reset so that the counting of the said watchdog timer begins at a second predetermined number, said second predetermined number being lower than the first predetermined number.

25. A control apparatus for a passenger conveyer as in claim 2 wherein each of said first and second electronic computer includes a watchdog timer.

26. A control apparatus for a passenger conveyer as in claim 25 wherein said first electronic computer can restart said second electronic computer after a failure of said second electronic computer and said second electronic computer can restart said first electronic computer after a failure of said first electronic computer.

27. A control apparatus for a passenger conveyer according to claim 1, wherein said first output signal is a stopping signal of said driving machine.

28. A control apparatus for a passenger conveyer according to claim 1, wherein said detecting means comprises a watchdog timer.

* * * * *